(12) United States Patent
Eklund et al.

(10) Patent No.: US 7,288,325 B2
(45) Date of Patent: Oct. 30, 2007

(54) HYDROGEN STORAGE MATERIAL BASED ON PLATELETS AND/OR A MULTILAYERED CORE/SHELL STRUCTURE

(75) Inventors: Peter C. Eklund, Boalsburg, PA (US); Terumi Furuta, Wako (JP); Hajime Goto, Wako (JP); Yoshiya Fujiwara, Dublin, OH (US); James H. Adair, State College, PA (US); Jennifer A. Nelson, State College, PA (US); Kishore Sreenivasan, San Diego, CA (US)

(73) Assignee: The Pennsylvania State University, University Park, PA (US)

(*) Notice: Subject to any disclaimer, the term of this patent is extended or adjusted under 35 U.S.C. 154(b) by 414 days.

(21) Appl. No.: 10/800,033

(22) Filed: Mar. 15, 2004

(65) Prior Publication Data

US 2005/0074612 A1 Apr. 7, 2005

Related U.S. Application Data

(60) Provisional application No. 60/477,150, filed on Jun. 9, 2003, provisional application No. 60/455,368, filed on Mar. 14, 2003.

(51) Int. Cl.
| | |
|---|---|
| B32B 5/16 | (2006.01) |
| B32B 5/22 | (2006.01) |
| B32B 15/01 | (2006.01) |
| B01J 23/44 | (2006.01) |
| B01J 23/56 | (2006.01) |

(52) U.S. Cl. ............... 428/570; 428/546; 428/402; 428/403; 502/400; 75/229; 75/247; 75/249

(58) Field of Classification Search .......... None
See application file for complete search history.

(56) References Cited

U.S. PATENT DOCUMENTS

| 4,844,790 A * | 7/1989 | Occelli .............. 208/46 |
|---|---|---|
| 6,346,136 B1 * | 2/2002 | Chen et al. .......... 75/343 |
| 6,589,312 B1 * | 7/2003 | Snow et al. .......... 75/255 |
| 6,685,986 B2 * | 2/2004 | Oldenburg et al. .... 427/214 |
| 6,749,892 B2 * | 6/2004 | Chang .............. 427/115 |
| 7,053,021 B1 * | 5/2006 | Zhong et al. ........ 502/185 |
| 2002/0034675 A1 * | 3/2002 | Starz et al. ......... 429/42 |
| 2002/0151634 A1 * | 10/2002 | Rohrbaugh et al. .... 524/430 |
| 2003/0198852 A1 * | 10/2003 | Masel et al. ........ 429/30 |
| 2006/0030483 A1 * | 2/2006 | Jang .............. 502/400 |
| 2006/0134505 A1 * | 6/2006 | Wang et al. ......... 429/40 |
| 2006/0196310 A1 * | 9/2006 | Toshima et al. ...... 75/392 |

OTHER PUBLICATIONS

Kuji, Toshiro et al., "Thermodynamic Properties of Hydrogen in Fine Pd Powders", 1999, *Journal of Alloys and Compounds 293-295*, pp. 19-22.

Kuji, Toshiro et al., "Hydrogen Absorption of Nanocrystalline Palladium", 2002, *Journal of Alloys and Compounds 330-332*, pp. 718-722.

(Continued)

*Primary Examiner*—Jennifer C. McNeil
*Assistant Examiner*—Jason Savage
(74) *Attorney, Agent, or Firm*—Arent Fox, LLP

(57) ABSTRACT

A hydrogen storage material includes a nano size material that can be formed in a multi-layered core/shell structure and/or in a nanotabular (or platelet) form.

7 Claims, 34 Drawing Sheets

OTHER PUBLICATIONS

Nishimiya, Nobuyuki et al., "Hyperstoichiometric Hydrogen Occlusion by Palladium Nanoparticles Included in NaY Zeolite", 2001, *Journal of Alloys and Compounds 319*, pp. 312-321.

Yamaura, Shin-ichi et al., "Hydrogen Absorption of Nanoscale Pd Particles Embedded in $ZrO_2$ Matrix Prepared from Zr-Pd Amorphous Alloys", Jun. 2002, *J. Mater Res.*, vol. 17, No. 6, pp. 1329-1334.

Zaluska, A. et al., "Structure, Catalysis and Atomic Reactions on the Nano-scale: A Systematic Approach to Metal Hydrides for Hydrogen Storage", 2001, *Applied Physics A Materials Science & Processing 72*, pp. 157-165.

\* cited by examiner

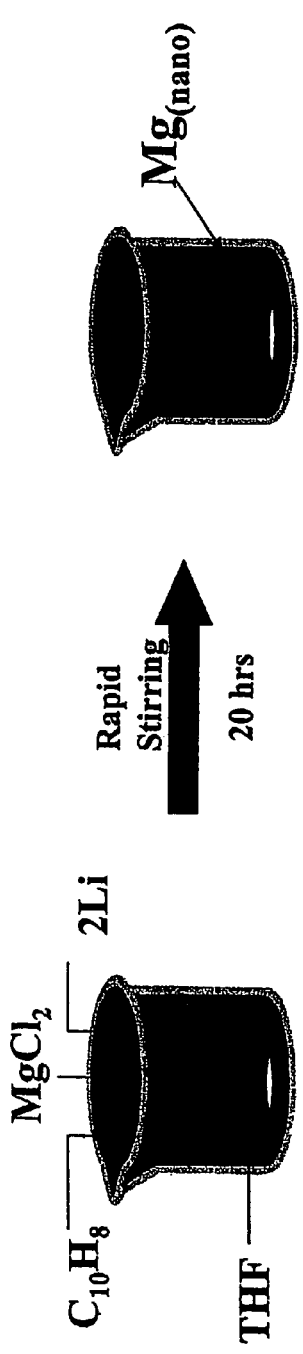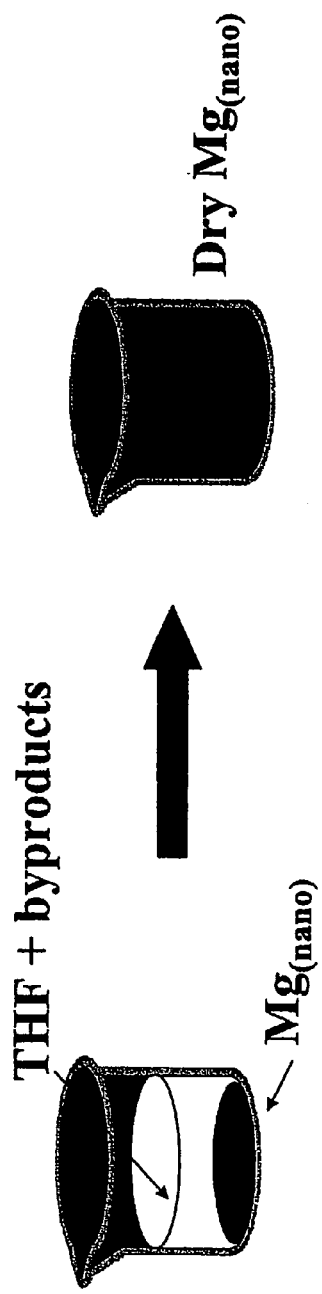
FIG. 2

Synthesized Mg

FIG. 3

| Sample | Amount Made | XRD crystallite size (Scherrer equation)* |
|---|---|---|
| Mg 1-2 | 0.198g | 23nm |
| Mg 1-10 | 0.4g | Used in Pd capping |
| Mg 1-13 | 0.4g | 37nm |
| Mg 1-18 | 0.2g | 34nm |
| Mg 1-41 | 0.2g | Used for Co capping |
| Mg 1-51 | 0.4g | 33nm |
| Mg 1-57a | 0.5g | 25nm |
| Mg 1-57b | 0.5g | Still in dry box |
| Mg 1-57c | 0.5g | Almost amorphous |

$$*t = [(0.9)(0.154)]/[(\beta)(\cos \theta)]$$

t = crystallite size in nm
$\beta$ = full width half max
$\theta$ = Bragg angle

Klug and Alexander, 1950

Spherical nPd
1) Micelle Formation
Igepal™
cyclohexane
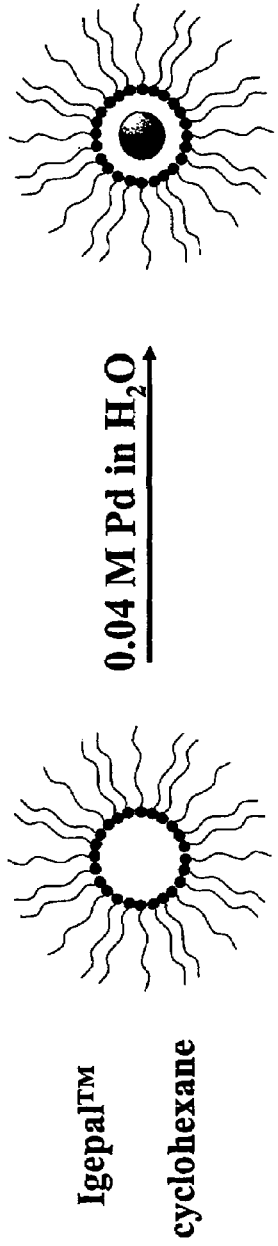
0.04 M Pd in H$_2$O
2) Reduction of Pd$^{+2}$ using Hydrazine Hydrate (H$_2$NNH$_2$·xH$_2$O)
2Pd$^{+2}$ (aq) + N$_2$H$_4$(aq) + 4OH$^-$ (aq) → 2Pd$^0$(s) + N$_2$(g) + 4H$_2$O
3) Break the Micelle and collect the Pd with ethanol
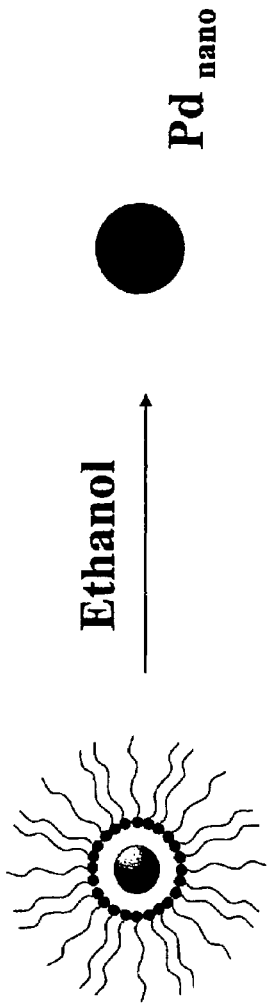
Ethanol
Pd$_{nano}$
FIG. 8

Controlling The Size

The size of the Pd spherical particle is dependent on the mole% ratio of surfactant (Igapal) to water often referred to as the R value.

$$R = [water]/[surfactant]$$

The larger the R value the larger the radius of the particle

FIG. 10
Spherical Pd Synthesized to Date

| Sample | R value | Amount made | Particle size* |
|---|---|---|---|
| Pd 1-62 | 8 | 1.3mg | |
| Pd 1-67 | 6 | 4mg | |
| Pd 1-68-1 | 1 | 2mg | |
| Pd 1-68-2 | 2 | 4mg | |
| Pd 1-69-1 | 1 | .67mg | |
| Pd 1-68-2 | 2 | 1.35mg | |
| Pd 1-69-6 | 6 | 12.3mg | |
| Pd 1-69-8 | 8 | 16.32mg | |
| Pd 1-70-7 | 7 | 19mg | |
| Pd 1-70-9 | 9 | 30.5mg | ~9nm |
| Pd 1-71 | 9 | 61mg | |
| Pd 1-73 | 5 | 63.6mg | |
| Pd 1-74-3 | 3 | 61mg | |
| Pd 1-74-7 | 7 | 71mg | |
| Pd 1-91-6 | 6 | 81.4mg | 5nm |
| Pd 1-91-8 | 8 | 108.5mg | 4nm |
| Pd 1-96 | 7 | 399mg | |
| Pd 1-100 | 25 | 84.8mg | 6nm |

*By Scherrer equation

Synthetic Approach For Platelet Pd Particles

Platelets Made

| Sample | R Value | Amount Made | F* | T* |
|---|---|---|---|---|
| Pd 1-75 | 6.8 | 20.4mg | | |
| Pd 1-77 | 20.4 | 228mg | | |
| Pd 1-80-3.4 | 3.4 | 66mg | | |
| Pd 1-80-1.7 | 1.7 | 33mg | | |
| Pd 1-86 | 10.2 | 236mg | | |
| Pd 1-91-8.5 | 8.5 | 212mg | | |
| Pd 1-91-6.8 | 6.8 | 254mg | | |
| Pd 2-5-1.7 | 1.7 | 21.2 | | |
| Pd 2-5-3.4 | 3.4 | 21.2 | | |
| Pd 2-5-6.8 | 6.8 | 21.2 | 33nm | 2nm |
| Pd 2-5-8.5 | 8.5 | 21.2 | | |
| Pd 2-5-10.2 | 1.2 | 21.2 | 150nm | 6nm |
| Pd 2-5-20.4 | 20.4 | 21.2 | | |
| Pd 2-8a | 10.2 | 21.2 | 130nm | 8nm |
| Pd 2-8b (AA) | 10.2 | 21.2 | 80nm | 1.7nm |

*

Materials Synthesized nMg

| Sample | Amount Made |
| --- | --- |
| Mg 1-2 | 0.198g |
| Mg 1-10 | 0.4g |
| Mg 1-13 | 0.4g |
| Mg 1-18 | 0.2g |
| Mg 1-41 | 0.2g |
| Mg 1-51 | 0.4g |
| Mg 1-57a | 0.5g |
| Mg 1-57b | 0.5g |
| Mg 1-57c | 0.5g |

Spherical nPd

| Sample | R Value | Amount Made |
| --- | --- | --- |
| Pd 1-62 | 8 | 1.3 mg |
| Pd 1-67 | 6 | 4 mg |
| Pd 1-68-1 | 1 | 2 mg |
| Pd 1-68-2 | 2 | 4 mg |
| Pd 1-69-1 | 1 | .67 mg |
| Pd 1-68-2 | 2 | 1.35 mg |
| Pd 1-69-6 | 6 | 12.3 mg |
| Pd 1-69-8 | 8 | 16.32 mg |
| Pd 1-70-7 | 7 | 19 mg |
| Pd 1-70-9 | 9 | 30.5 mg |
| Pd 1-71 | 9 | 61 mg |
| Pd 1-73 | 5 | 63.6 mg |
| Pd 1-74-3 | 3 | 61 mg |
| Pd 1-74-7 | 7 | 71 mg |
| Pd 1-91-6 | 6 | 81.4 mg |
| Pd 1-91-8 | 8 | 108.5 mg |
| Pd 1-96 | 7 | 399 mg |
| Pd 1-100 | 25 | 84.8 mg |

Platelet nPd

| Sample | R Value | Amount Made |
| --- | --- | --- |
| Pd 1-75 | 6.8 | 20.4 mg |
| Pd 1-77 | 20.4 | 228 mg |
| Pd 1-80-3.4 | 3.4 | 66 mg |
| Pd 1-80-1.7 | 1.7 | 33 mg |
| Pd 1-86 | 10.2 | 236 mg |
| Pd 1-91-8.5 | 8.5 | 212 mg |
| Pd 1-91-6.8 | 6.8 | 254 mg |
| Pd 2-5-1.7 | 1.7 | 21.2 |
| Pd 2-5-3.4 | 3.4 | 21.2 |
| Pd 2-5-6.8 | 6.8 | 21.2 |
| Pd 2-5-8.5 | 8.5 | 21.2 |
| Pd 2-5-10.2 | 1.2 | 21.2 |
| Pd 2-5-20.4 | 20.4 | 21.2 |
| Pd 2-8a | 10.2 | 21.2 |
| Pd 2-8b (AA) | 10.2 | 21.2 |

FIG. 16

Comparison of TGA Evaluations at 100C for Nano and Bulk Samples

| Sample | Knee for H/Pd Ratio | Plateau Onset (Wt %) | Estimated Adsorption Rate* (H/Pd/min) | Estimated Desorption Rate* (H/Pd/min) |
|---|---|---|---|---|
| Pd 1-74-7 R = 7 (4-5 nm Spheres) | ~0.78 | ~0.47 | ~0.01 | ~0.005 |
| Pd 1-86 R = 10.2 (8 nm thick Platelets) | ~0.65 | ~0.2 | 0.007 | 0.003 |
| Bulk (1.0 – 1.5 μm) | ~0.6 | ~0.08 | 0.005 | 0.002 |

\* Possibly affected by sintering

FIG. 18

FIG. 21    TGA Compositional Analysis

| Sample | Pd in sample | Wt.%Pd as PdO in sample | Wt.% Carbon | η corr. factor |
|---|---|---|---|---|
| Spherical | | | | |
| Pd 2-35 R=2 (4nm) | 95.34% | 0% | 2.37% | 1.05 |
| Pd 2-71 R=8 | 96.16% | 0% | 0.05% | 1.04 |
| Platelet | | | | |
| Pd 2-65-10 R=10 (327nm X 2.8nm to 109nm X 1.5nm) | 87.26% | 0% | 0.08% | 1.15 |
| Pd 2-65-7 R=7 (82nm X 1.3nm) | 94.69% | 0% | 0.17% | 1.06 |

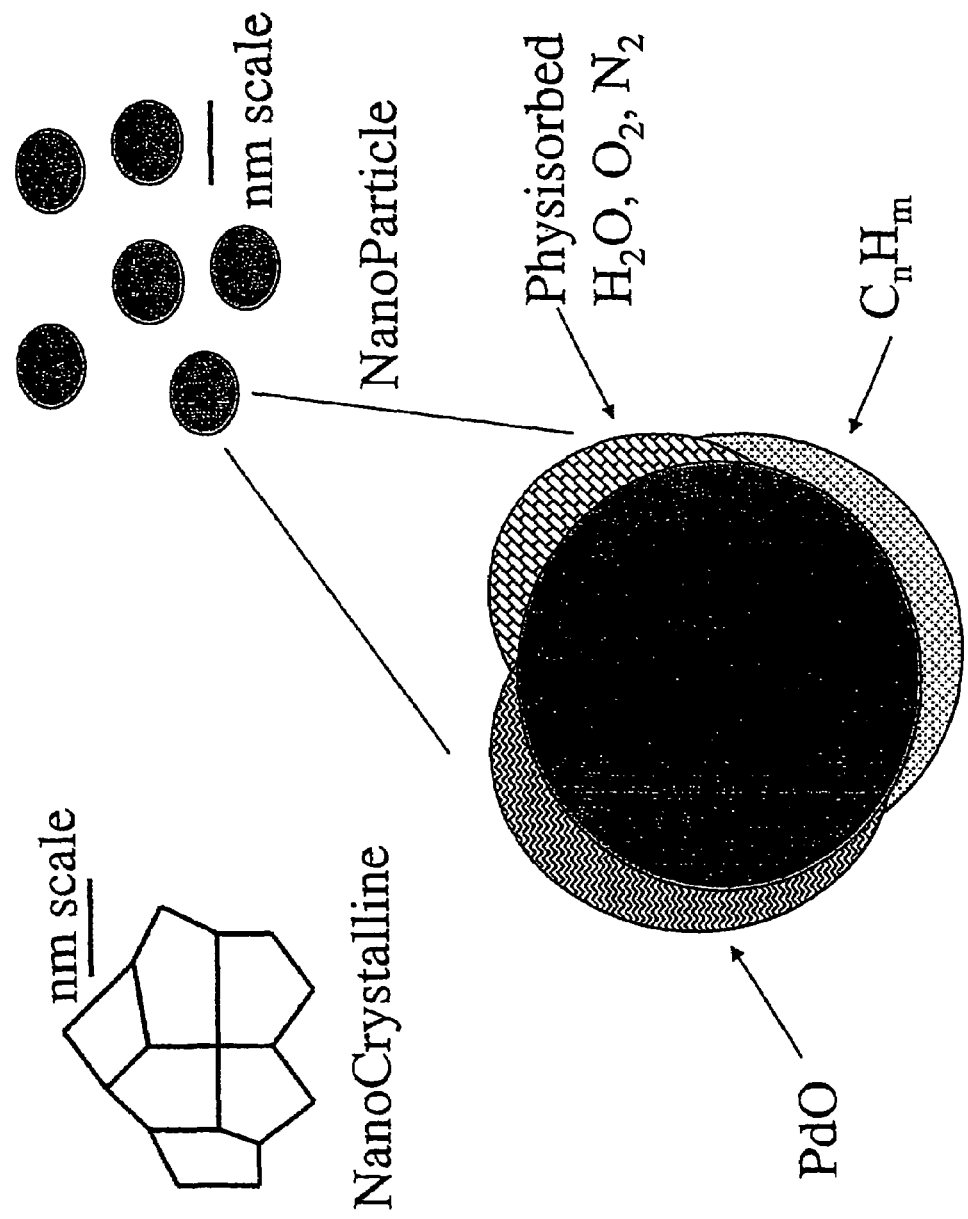
FIG. 22 NanoCrystalline vs NanoParticle

FIG. 23. Effect of morphology on particle packing
Spherical
vs
Platelet
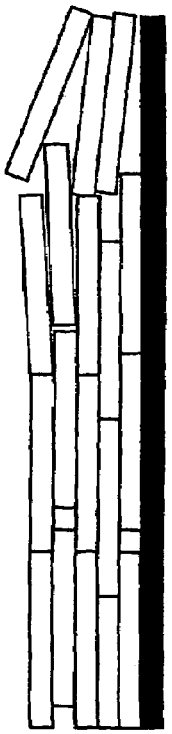
$t \sim 1\text{-}200$ nm
$a/t \sim 10\text{-}100$
$r \sim 3\text{-}50$ nm
*Particle Packing Characteristics*
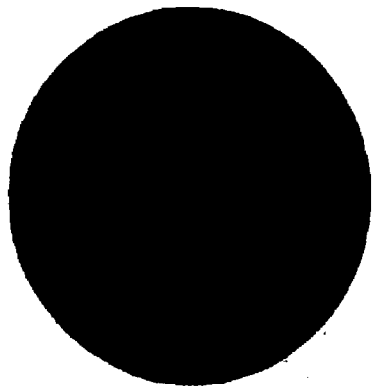
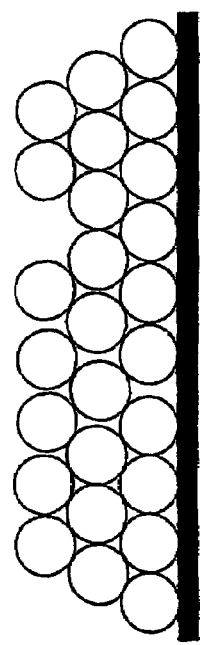

FIG. 24 HRTEM of Platelet nanoPd
Moire fringes

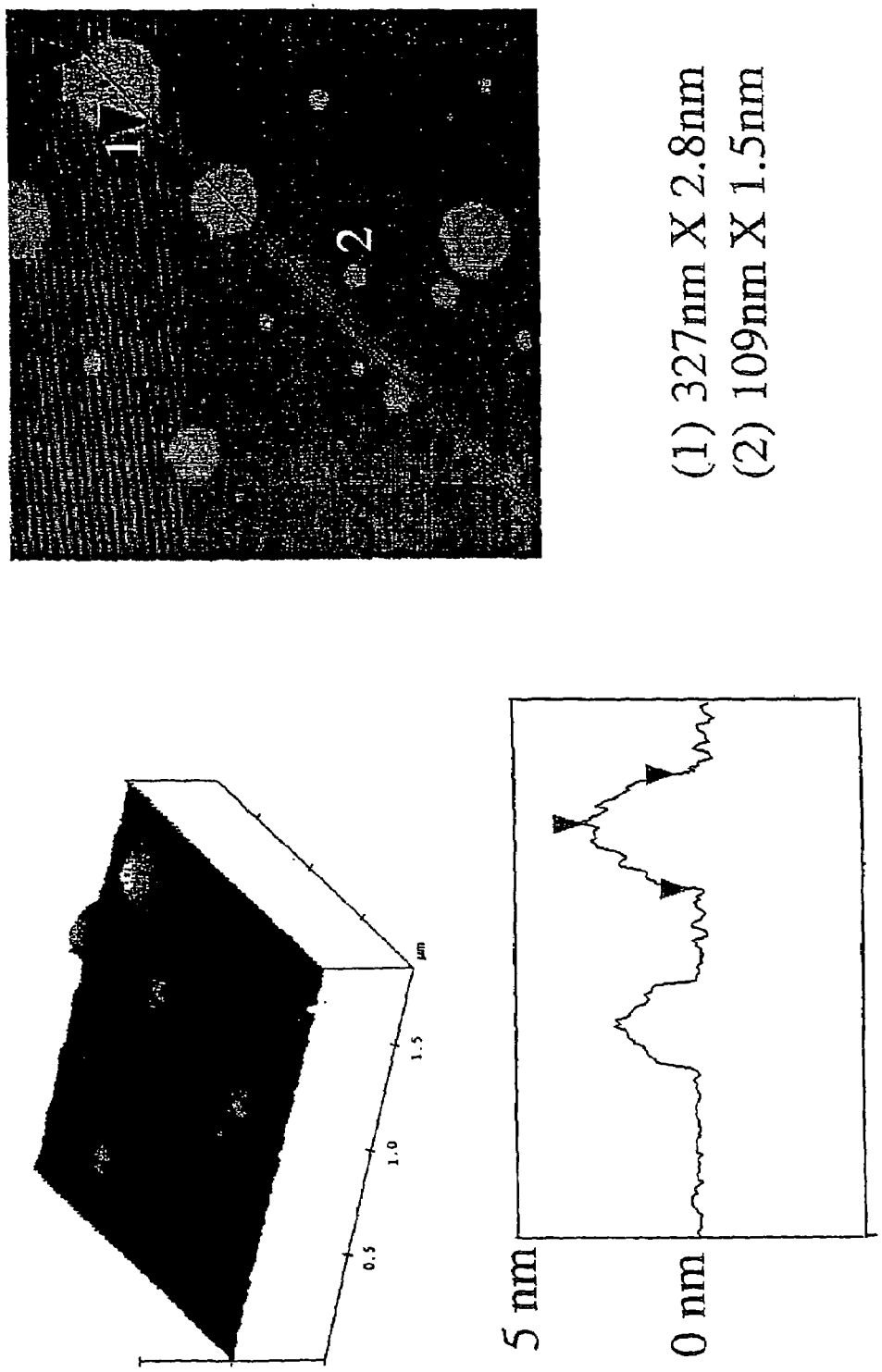
FIG. 25  AFM of Platelet nanoPd
(1) 327nm X 2.8nm
(2) 109nm X 1.5nm

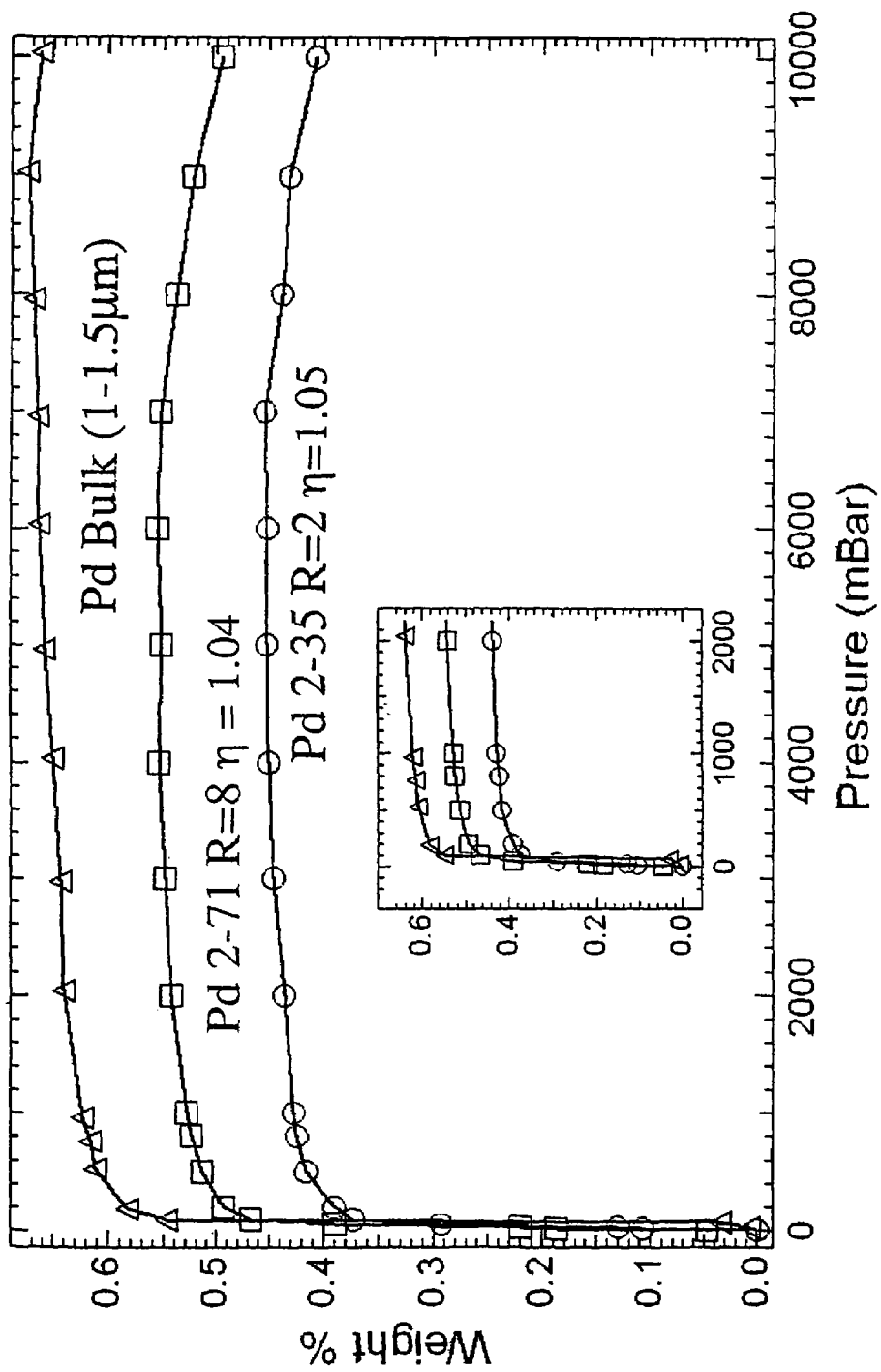
FIG. 26 H Adsorption of Spherical Pd

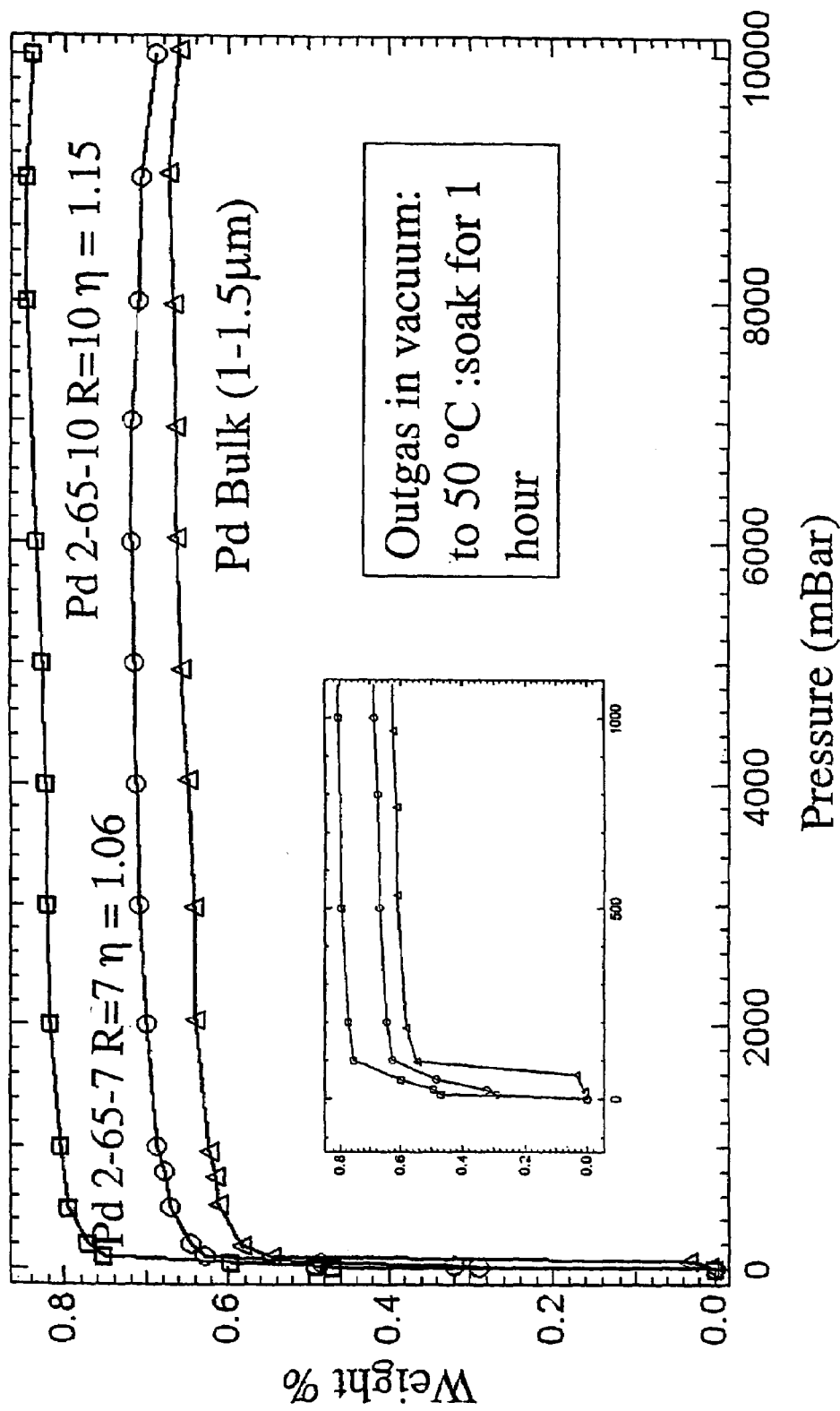
FIG. 27 H Adsorption of Pd Platelets

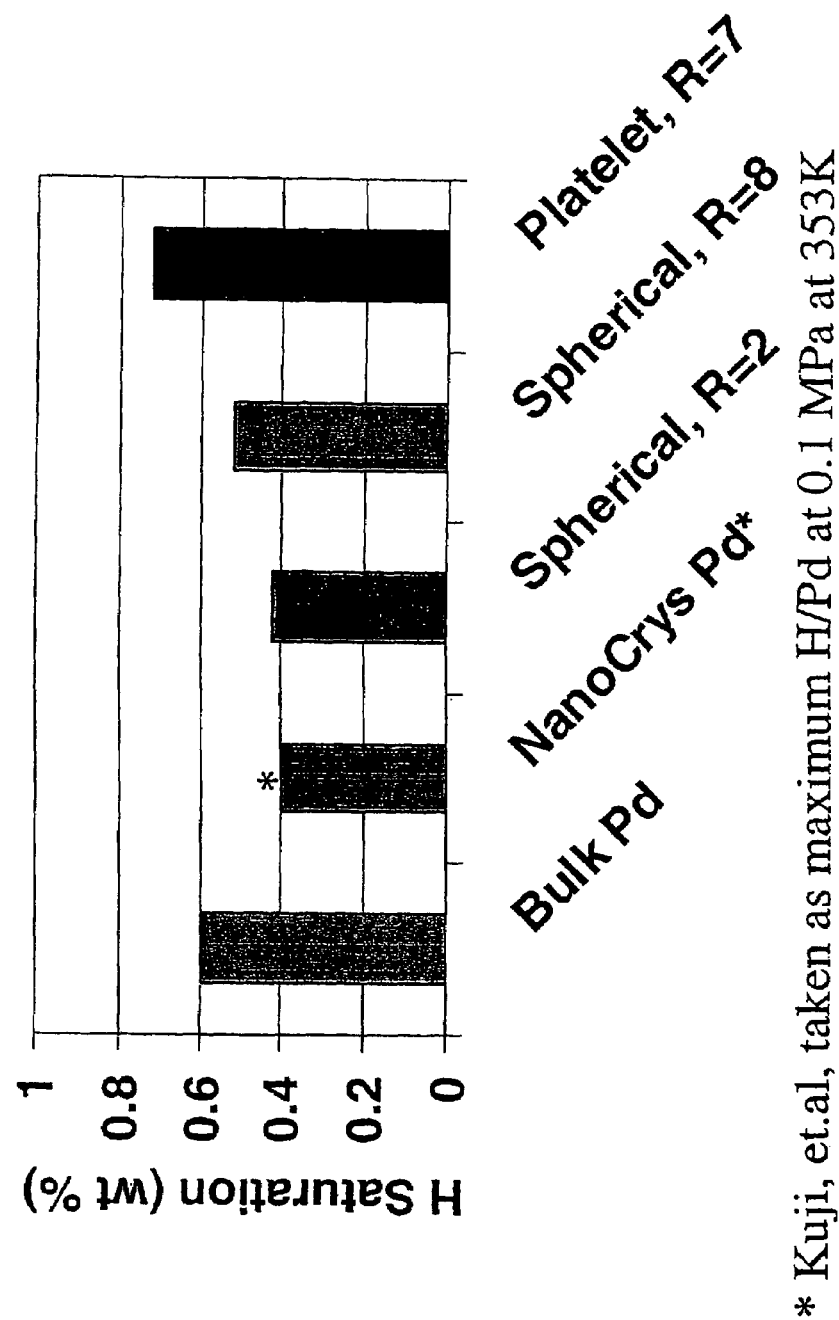
FIG. 28 Hydrogen Saturation vs Pd Material
* Kuji, et.al, taken as maximum H/Pd at 0.1 MPa at 353K HRTEM of Platelet Particles

Review of nanoPd Sample tested for Hydrogen Storage

| Sample | | R | %Pd | $d^1$ | $a^2$ | $t^3$ |
|---|---|---|---|---|---|---|
| Reverse Micelle Synthesis | | | | | | |
| 2-35* | spherical | 2 | 95 | 4 | | |
| 2-71* | spherical | 8 | 96 | 5 | | |
| 2-44 | spherical | 5 | 82 | | | |
| Bilayer Synthesis | | | | | | |
| 2-65-10 | mixed | 10 | 87 | 5 | 327 | 2.8 |
| | | | | | 109 | 1.5 |
| 3-18 | platelet | 8 | 96 | | 70 | 2 |
| 3-33 | platelet | 6 | 94 | | 130 | 2.6 |

R = [water]/[Surfactant], 1 = diameter of spherical particle, 2 = face size of platelet particle, and 3 = thickness of platelet particle in nm. * Samples washed with hydrazine

FIG. 31

Surface area vs. heating time for sample synthesized by bilayers. Samples A(sample 3-18) and B(sample 3-33) consist of only platelets. Sample C(sample 2-65-10) is a mix of platelets and spherical particles. Heating temperatures are ○ = room temperature, □ = 50 °C, ◇ = 75 °C, △ = 100 °C, ✽ = 150 °C, ● = 200 °C, ■ = 250 °C.

Surface area vs. heating time for spherical particles synthesized via reverse micelles. A(sample 2-44) and B(sample 2-35) = not washed with hydrazine hydrate. C(sample 2-71) and D(sample 2-35) = washed with hydrazine hydrate. Lines B and D are both of sample 2-35. Heating temperatures are O = room temperature, □ = 50 °C, △ = 100 °C, and ✱ = 150 °C.

HYDROGEN STORAGE MATERIAL BASED ON PLATELETS AND/OR A MULTILAYERED CORE/SHELL STRUCTURE

CROSS-REFERENCE TO RELATED APPLICATIONS

This application claims priority to U.S. Provisional Applications No. 60/455,368, filed Mar. 14, 2003, and No. 60/477,150, filed Jun. 9, 2003, both of which are incorporated herein by reference in their entireties.

BACKGROUND OF THE INVENTION

1. Field of the Invention

This invention is related to a hydrogen storage material, and particularly to a hydrogen storage material based on a multilayered core/shell structure.

2. Description of the Related Art

Hydrogen fuel cells have steadily gained acceptance as a mainstream energy source as a result of their environmentally friendly nature and potential for decreasing dependence on foreign oil. Fuel cells can produce large amounts of power without the use of fossil fuels, producing only water as a byproduct. It is hoped that in the near future natural resource guzzlers such as the automobile will run primarily on fuel cells.

Presently, hydrogen can be stored in a rechargeable metal hydride or in a hydride compound that releases hydrogen when reacted with water. Physically, hydrogen can be stored as a compressed gas, a cryogenically cooled liquid, or through surface absorption. The problem with these various storage means as they relate to the automotive industry is that a large tank is required for storing sufficient hydrogen to power a vehicle. This inefficiency has impeded the progress of hydrogen fuel cell use in automobiles.

With the current technology, the compressed hydrogen tank size required for a 1500 kg vehicle with a driving range of 560 km is 340 L at 25 Mpa. This tank stores approximately 6.8 kg of hydrogen. In contrast, a typical gasoline tank for such a vehicle is 70 L. Accordingly, there is a need for a material that can store sufficient compressed hydrogen to power a vehicle without consuming an undue amount of space.

Various hydrogen storage materials and the like are known in the art.

SUMMARY OF THE INVENTION

It is an object of this invention to overcome deficiencies and limitations of the known hydrogen storage materials through the utilization of nanomaterials.

The above and other objects of this invention are achieved by a hydrogen storage material, in some embodiments of which, comprises metal nanoparticles that are a) a mixture of nanometer scale platelets and nanometer scale equiaxial particles and/or b) a metal core covered by a metal shell or metal coating.

In some embodiments of this invention, the hydrogen storage material can be a mixture of nanometer scale platelets and nanometer scale equiaxial particles.

In some embodiments of this invention, the nanoparticles form a metal core covered by a metal shell or metal coating that provides oxidation resistance to the metal core, which is less noble than the coating.

In some embodiments of this invention, the nanoparticles form a metal core covered by a metal shell or metal coating that provides catalysis for dehydrogenation.

In some embodiments of this invention, the nanoparticles form a metal core covered by a) a first metal coating that provides oxidation resistance to the core metal, which is less noble than the coating, and b) a second metal coating that provides catalysis for dehydrogenation.

In some embodiments of this invention, the metal nanoparticles are selected from Ti, V, Cr, Mn, Fe, Co, Ni, Cu, Li, Mg, Ca, Na, K, Pd, Pt, Au, or Ag, or an alloy containing one or more of these metals.

In some embodiments of this invention, the shell or coating is selected from Cr, Mn, Fe, Co, Ni, Cu, Pd, Pt, Au, or an alloy containing one or more of these metals.

In some embodiments of this invention, the platelets have a thickness of about 1 nm to about 200 nm and a face dimension of about 10 nm to about 1000 nm.

In some embodiments of this invention, an aspect ratio (face diameter divided by thickness) of the platelets ranges from about 10 nm to about 100 nm.

In some embodiments of this invention, the platelets are Pd platelets.

In some embodiments of this invention, the nanoparticles form a metal core covered by a first coating that provides oxidation resistance to the core metal, which is less noble than the coating, and/or a second coating that provides catalysis for dehydrogenation.

In some embodiments of this invention, the metal is selected from Ti, V, Cr, Mn, Fe, Co, Ni, Cu, Li, Mg, Ca, Na, K, Pd, Pt, Au, or Ag, or an alloy containing one or more of these metals.

In some embodiments of this invention, the first and/or second coating is selected from Cr, Mn, Fe, Co, Ni, Cu, Pd, Pt, Au, or an alloy containing one or more of these metals.

Some embodiments of this invention are directed to a method of preparing a hydrogen storage material, comprising: mixing octylamine and palladium nitrate; adding hydrazine as a reducing agent thus forming a mixture of metal nanoparticles comprising platelets and equiaxial particles; and separating and recovering the platelets and equiaxial particles. In some embodiments of this invention, the about 1 part molar amylamine is also mixed with the octylamine, which is present in about 25 parts molar.

Some embodiments of this invention are directed to a hydrogen storage material comprising nanoparticles with each nanoparticle comprising a) a core comprising a metal selected from the group consisting of Ti, V, Cr, Mn, Fe, Co, Ni, Cu, Li, Mg, Ca, Na, K, Pd, Pt, Au, Ag and an alloy containing one or more of these metals; a shell comprising a metal selected from the group consisting of Cr, Mn, Fe, Co, Ni, Cu, Pd, Pt or Au and an alloy containing one or more of these metals; wherein the metal or alloy of the core is different from the metal or alloy of the shell.

In some embodiments of this invention, the core material is Mg.

In some embodiments of this invention, the shell is an alloy containing a polymeric material.

Some embodiments of this invention are directed to a hydrogen storage material, comprising: a) a mixture of nanometer scale platelets and nanometer scale equiaxial particles that each comprise cores comprising a metal selected from the group consisting of Ti, V, Cr, Mn, Fe, Co, Ni, Cu, Li, Mg, Ca, Na, K, Pd, Pt, Au, Ag and an alloy containing one or more of these metals, b) a shell over the cores, said shell comprising a metal that is more noble than a less noble metal of the core and that is selected from the group consisting of Cr, Mn, Fe, Co, Ni, Cu, Pd, Pt or Au and an alloy containing one or more of these metals, wherein said shell is capable of providing catalysis for dehydrogenation and/or capable of providing oxidation resistance to the less noble core metal.

In some embodiments of this invention, the cores are Mg or an alloy containing Mg.

In some embodiments of this invention, the platelets comprise nanometer scale Pd platelets that have a thickness of about 1 nm to about 200 nm and a face dimension of about 10 nm to about 1000 nm, an aspect ratio (face diameter divided by thickness) of the nanometer scale platelets ranges from about 10 nm to about 100 nm.

Some embodiments of this invention are directed to a method of preparing a hydrogen storage material, comprising the steps of: mixing $C_{10}H_8$, $MgCl_2$, Li and THF with rapid stirring to form Mg; removing the THF and dissolved by-products to recover Mg nanoparticles; and mixing the Mg nanoparticles with THF, Igepal Co-520, hydrazine hydrate (for reduction of metal salts) and with palladium chloride, palladium nitrite or cobalt chloride, to coat the Mg nanoparticles with palladium, cobalt and/or an alloy containing palladium or cobalt to form at least one shell or coating over the Mg nanoparticles. In some embodiments of this invention, the palladium, cobalt or an alloy containing palladium or cobalt, is palladium and the shell or coating is a first shell or coating of MgPd, over which is a second shell or coating of Pd.

BRIEF DESCRIPTION OF THE DRAWINGS

This invention will become even more apparent from the following description of embodiments of the invention taken in conjunction with the accompanying drawings, in which:

FIG. 2 shows an example of Mg nanoparticles synthesis in accordance with embodiments of this invention.

FIG. 3 lists several exemplary samples of Mg synthesized in accordance with this invention.

FIG. 4 shows that the XRD matches that of an indexed Mg pattern.

FIG. 6 shows that, after exposure to water for 48 hours, sample Mg 1-13 turned white with XRD giving $Mg(OH)_2$.

FIG. 8 shows an example of a method for preparing substantially spherical or equiaxially nanoparticle Pd in accordance with embodiments of this invention. In particular, a can be utilized in which palladium, for example about 0.04 M Pd in water can be mixed with Igepal™ and cyclohexane to form micelles.

FIG. 10 lists several exemplary samples of Pd synthesized in accordance with this invention.

FIGS. 15 and 16 list several exemplary samples of Pd synthesized in accordance with embodiments of this invention.

FIG. 18 shows a comparison of TGA evaluations at 100° C. for nanoparticle and bulk samples.

FIG. 21 shows TGA compositional analysis for several examples of spherical particles and of platelets in accordance with embodiments of this invention.

FIG. 22 is a diagram showing the difference between a nanocrystalline material from nanoparticles in accordance with embodiments of this invention.

FIG. 23 shows how morphology can affect particle packing in accordance with embodiments of this invention.

FIG. 24 shows HRTEM for platelet nanoPd in accordance with embodiments of this invention.

FIG. 25 shows AFM of platelet nanoPd in accordance with embodiments of this invention.

FIG. 26 shows hydrogen adsorption of spherical Pd in accordance with embodiments of this invention.

FIG. 27 shows hydrogen adsorption of Pd platelets in accordance with embodiments of this invention.

FIG. 28 shows hydrogen saturation versus Pd material in accordance with embodiments of this invention.

FIG. 31 shows a review of nanoPd samples tested for hydrogen storage in accordance with embodiments of this invention.

DESCRIPTION OF THE PREFERRED EMBODIMENTS

Figure 1A:
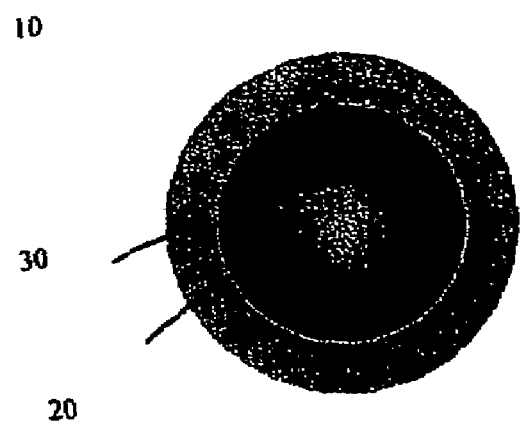
FIG. 1A is a cross sectional representation of a nanoparticle 10 having a core 20 and a shell layer 30.

Nanoparticles, due to their high surface areas, are able to adsorb large amounts of hydrogen. This has been demonstrated by Yamaura et al. (see J. Mater. Res. 2002, 17 #6, 1329-1334) using nanoscale palladium. Adsorption temperature can be a critical aspect in the practical performance of Pd. The more efficient the H-adsorption at lower temperatures, the more practical the use of Pd as a hydrogen storage material. Kuji et al. (J. Alloys Compounds, 330-332, (2002) 718-722) evaluated the hydrogen adsorption on nanocrystalline Pd. It was found that the nanocrystalline material adsorbs less hydrogen than a corresponding bulk material. The present inventors have found that spherical nano-Pd particles adsorb less hydrogen than bulk Pd.

Additionally, Pd and other rare earth metals are extremely expensive.

Hence, in some embodiments of this invention, hydrogen storage materials have been fabricated using less expensive and more widely available elements.

A problem with many nanomaterials that have high affinity for hydrogen storage is that they are very susceptible to oxidation. Thus, they are impractical for routine hydrogen storage.

Thus, in embodiments of this invention, multi-layered (core/shell) structured nanomaterials are prepared and/or utilized as hydrogen storage material to alleviate this problem.

The multi-layer (core/shell structure) structured nanomaterials of embodiments of this invention comprise a plurality of nanoparticles with lattice parameters on the order of about 1 to about 10 nm diameter. Each nanoparticle further comprises a core element that can be selected from a transition metal, for example Ti, V, Cr, Mn, Fe, Co, Ni, Cu, from a lightweight metal, for example Li, Mg, Ca, Na, K, from a noble metal, for example Pd, Pt, Au, Ag, or from an alloy containing and/or consisting of one or more of the foregoing metals. The core material is responsible for hydrogen uptake.

The core material is in turn encased with a shell element that can be selected from a transition metal, for example Cr, Mn, Fe, Co, Ni, Cu, from a noble metal, for example Pd, Pt, Au, from a noble metal, elemental carbon, a carbon polymer, or from an alloy containing and/or consisting of one or more of the forgoing elements.

In at least some embodiments of this invention, platelet-shaped particles, for example Pd particles, can be prepared and utilized. The platelet-shaped Pd particles can be of nanometer scale dimensions in at least one direction. The platelet-shaped Pd particles adsorb significantly more hydrogen than bulk Pd and either nanocrystalline material or nanometer scale spheres. The nanoplatelet particles provided in this invention can be produced in greater quantities, per unit volume of reacting material, than nanoscale spherical materials, and the nanoscale platelets are more resistant to deleterious (to hydrogen storage performance) than nanoscale spherical particles.

In some embodiments of this invention, the platelet-shaped particles can be mixed with spherical or substantially spherical or equiaxial particles, for example Pd particles.

In at least some embodiments of the hydrogen storage materials of this invention can comprise a nanotabular metal. In at least some embodiments of this invention, the hydrogen storage material can further comprise a coating that provides oxidation resistance to a core material (preferably less noble) used for hydrogen uptake and storage. In some embodiments of this invention, the coating can provide catalysis for dehydrogenation. In further embodiments of this invention, a combination of coatings can be used, such as and for example a combination of coatings that provides oxidation resistance and that provides catalysis dehydrogenation.

The nanometer Pd platelets of some embodiments of this invention preferably have a thickness of about 1 to about 200 nm and face dimensions of about 10 to about 1000 nm. Corresponding aspect ratios (face diameter divided by thickness) preferably range from about 10 to about 100 nm.

The platelet materials of some embodiments of this invention can include a transition metal (for examples Ti, V, Cr, Mn, Fe, Co, Ni, Cu), a lightweight material (for examples Li, Mg, Ca, Na, K), a noble metal (for example Pd, Pt, Au, Ag), or an alloy of the foregoing elements. The hydrogen adsorption isotherm for nanometer platelet particles, for example nanometer platelet Pd particles, exceeds the hydrogen saturation pressure for bulk Pd at 50° C. by about 5 to about 20%. The adsorption isotherm also saturates at the low temperatures.

In at least some embodiments of this invention, the coated platelet materials can be comprised of a core platelet made of a transition metal (for examples Ti, V, Cr, Mn, Fe, Co, Ni, Cu), a lightweight material (for examples Li, Mg, Ca, Na, K), a noble metal (for example Pd, Pt, Au, Ag), or an alloy containing or consisting of one or more of the foregoing elements. In at least some embodiments, the coating can comprise a transition metal (for examples Cr, Mn, Fe, Co, Ni, Cu), a noble metal (for examples Pd, Pt, Au), an alloy containing or consisting of one or more of the foregoing elements, elemental carbon or a carbon polymer. Such a shell can prevent oxidation of the core material while simultaneously allowing passage of hydrogen to the core material where hydrogen is stored.

In embodiments of this invention, the platelets can be synthesized in a "self-assembly" molecular-water system that can contain, for example, aqueous solution with amphophilic molecules that spontaneously form a bilayer (also known as a neat phase D) in which platelet particles form in the resulting sheets of aqueous phase. A typical concentration of metal cations such as $Pd^{2+}$(aq) that can be used in embodiments of this invention as the chloride salt ranges from about 0.001 M to about 1.0 M, preferably from about 0.01M to about 0.1 M, and more preferably about 0.04M. A typical range for a reducing agent that can be used in embodiments of this invention is about $10^{-5}$ M to about $10^{-1}$ M for reducing agents, such as and for example hydrazine hydrate ($N_2H_4xH_2O$).

Figure 1B:
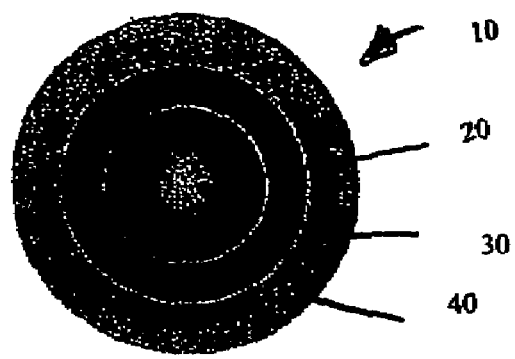
FIG. 1B shows a cross-sectional representation of a nanoparticle 10 having a core 20 and a first shell layer 30 and a second shell layer 40 synthesized in accordance with embodiments of this invention.

Referring now to FIG. 1A, there is shown a cross-sectional representation of a nanoparticle 10 having a core 20 and a shell layer 30. FIG. 1B shows a cross-sectional representation of a nanoparticle 10 having a core 20 and a first shell layer 30 and a second shell layer 40. As discussed above, the nanoparticle 10 can be used as a hydrogen storage material. The core 20 is preferably selected from a transition metal, for example Ti, V, Cr, Mn, Fe, Co, Ni, Cu, from a lightweight metal, for example Li, Mg, Ca, Na, K, from a noble metal, for example Pd, Pt, Au, Ag, or from an alloy containing and/or consisting of one or more of the foregoing metals. The core material is responsible for hydrogen uptake.

The shell 30 and shell 40 are preferably selected from transition metals, for example Cr, Mn, Fe, Co, Ni, Cu, from noble metals, for example Pd, Pt, Au, elemental carbon, carbon polymers, or from alloys containing and/or consisting of one or more of the forgoing elements. In a preferred embodiment, the core is Mg, the first shell 30 is an alloy of Mg and Pd, and the second shell 40 is Pd.

The shell can be utilized to prevent severe oxidation of the core material, to activate hydrogen recombination and/or to store hydrogen. The core 20 and shells 30 and 40 will typically be formed from different metals or alloys.

FIG. 2 shows an example of Mg nanoparticles synthesis in accordance with embodiments of this invention. In particular, a Rieke type process is utilized. First, $MgCl_2$ is mixed with THF Li and $C_{10}H_8$, preferably in an Ar glove box, which reduces the $MgCl_2$ to Mg metal. The Mg nanocrystals are separated from the THF and dissolved by-products, and can then be washed to remove any additional by-products.

Figure 4:
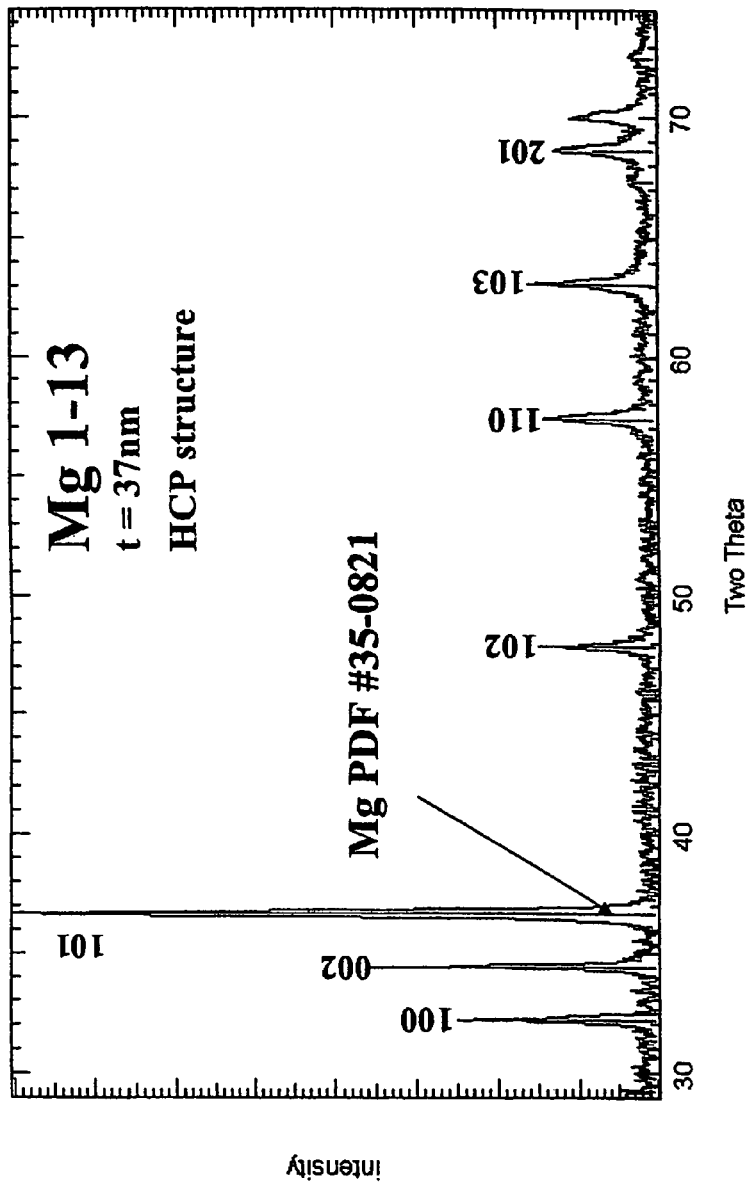
FIG. 4 shows an XRD for Mg sample no. 1-13 listed in FIG. 3.
Figure 5:
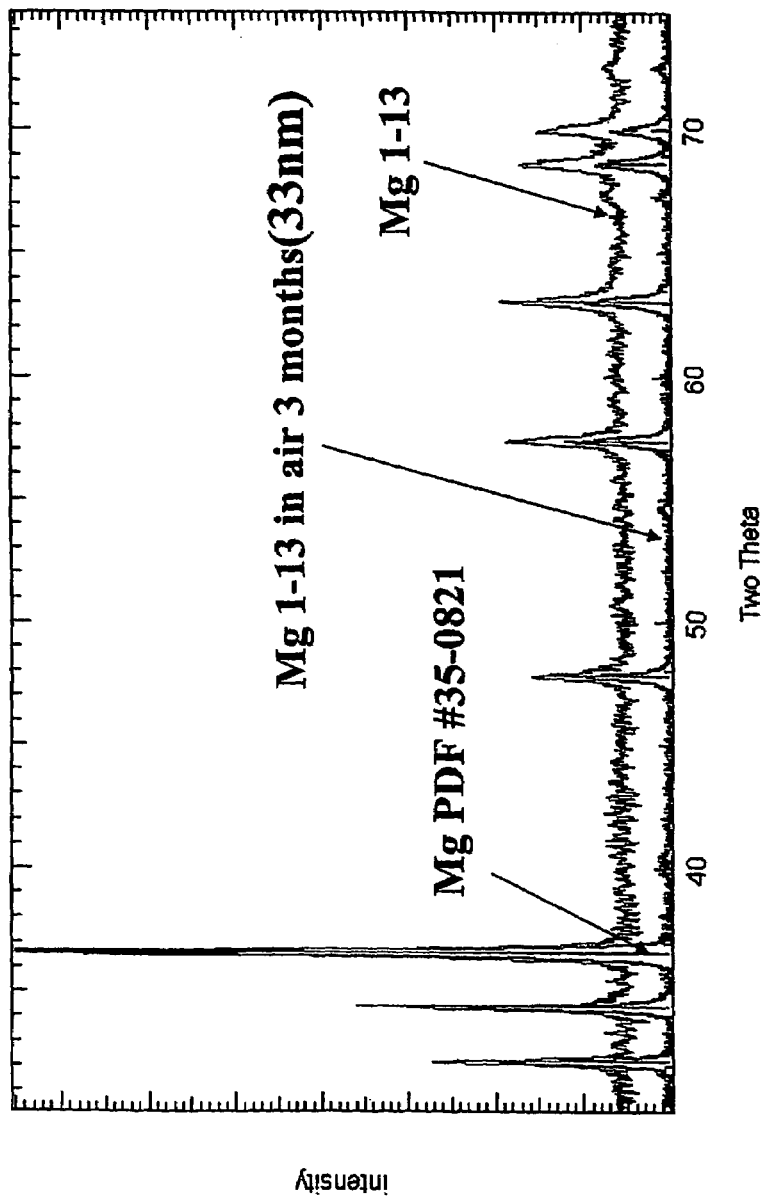
FIG. 5 shows that the Mg 1-13 sample was still stable in atmospheric conditions after 3 months.
Figure 6:
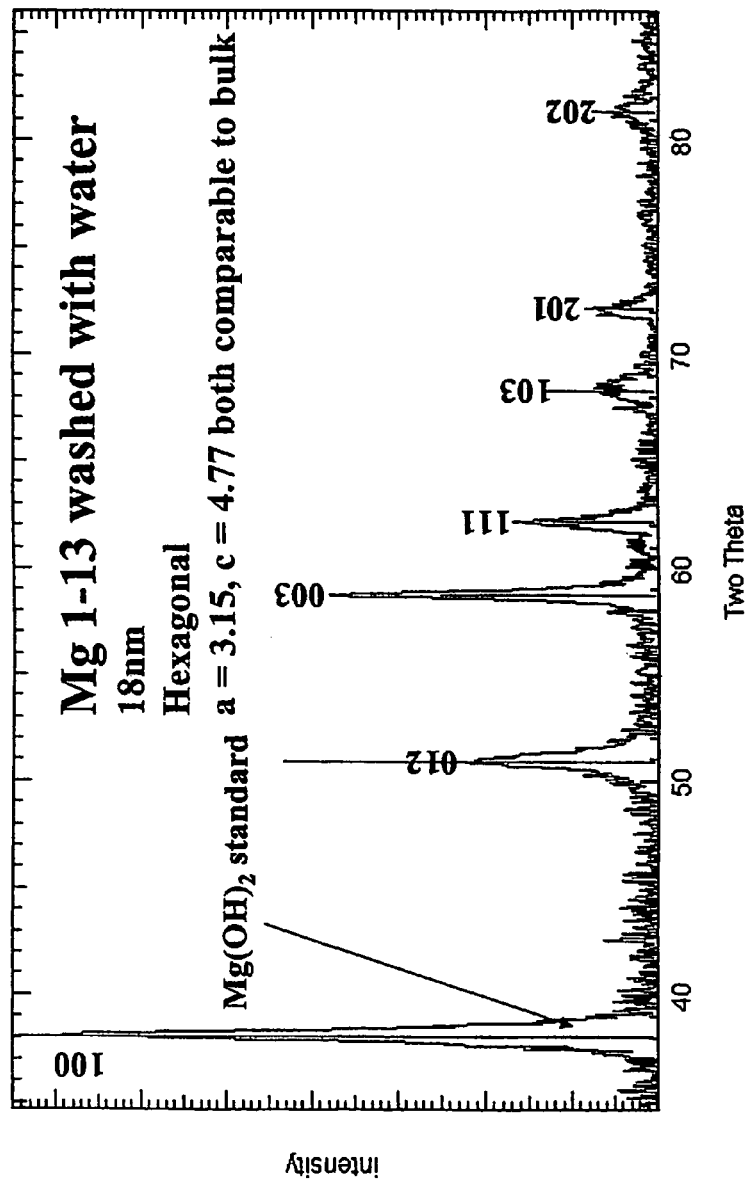
FIG. 6 shows phase stability in water. In particular.

FIG. 3 lists several exemplary samples of Mg synthesized in accordance with this invention. FIG. 4 shows an XRD for Mg sample no. 1-13 listed in FIG. 3. FIG. 4 shows that the XRD matches that of an indexed Mg pattern. The material is coated with amorphous $sp^2$ carbon allowing it to be stable in air. FIG. 5 shows that the Mg 1-13 sample was still stable in atmospheric conditions after 3 months. FIG. 6 shows phase stability in water. In particular, FIG. 6 shows that, after exposure to water for 48 hours, sample Mg 1-13 turned white with XRD giving $Mg(OH)_2$.

Figure 7:
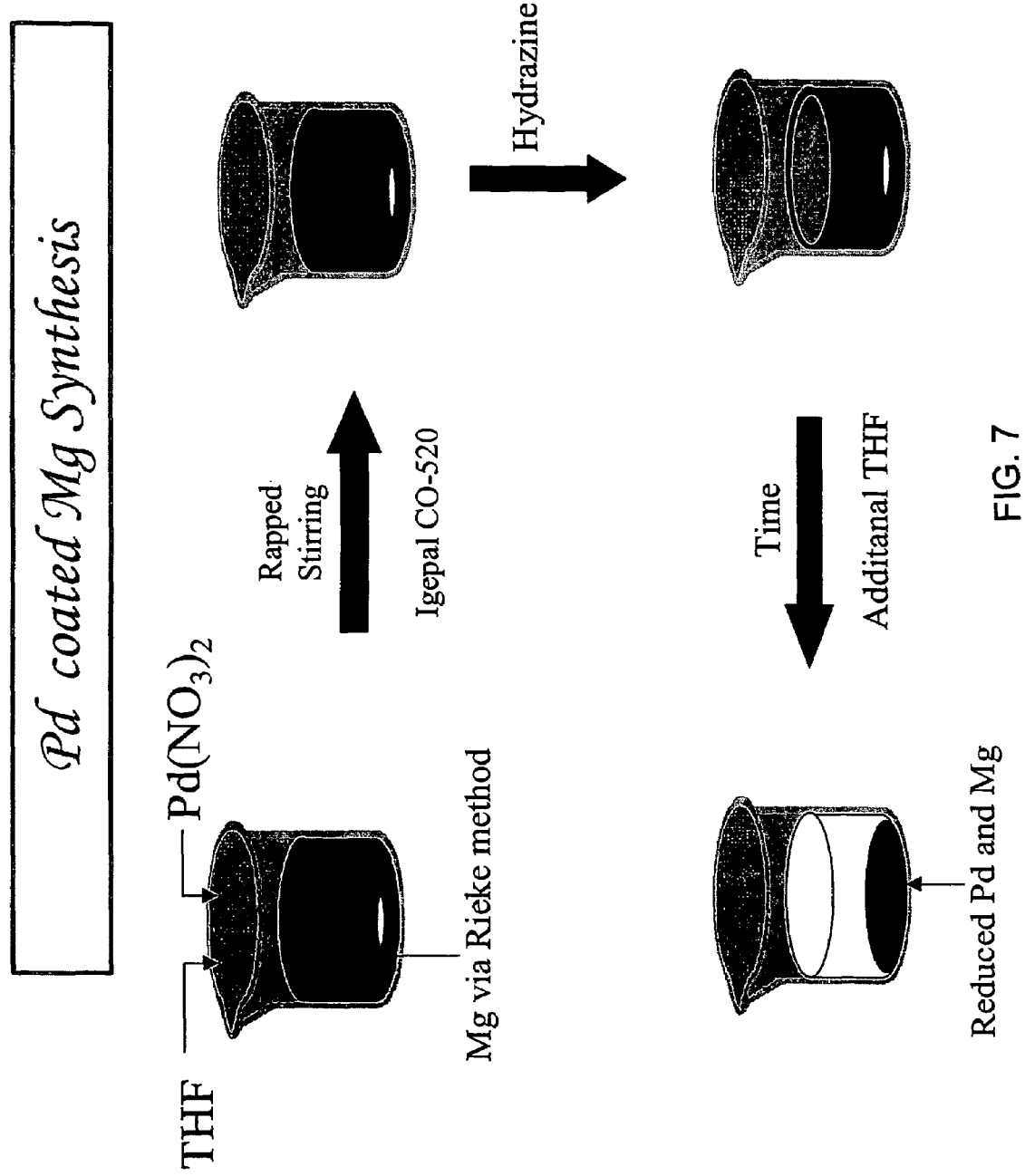
FIG. 7 shows an example of the method for coating Mg nanoparticles with Pd, in accordance with embodiments of this invention.

FIG. 7 shows an example of the for coating Mg nanoparticles with Pd, in accordance with embodiments of this invention. In particular, Pd is synthesized by reduction with hydrazine hydrate in the presence of Igepal™, THF and previously synthesized Mg.

FIG. 8 shows an example of a method for preparing substantially spherical or equiaxially nanoparticle Pd in accordance with embodiments of this invention. In particular, a method can be utilized in which palladium, for example about 0.04 M Pd in water, can be mixed with Igepal™ and cyclohexane to form micelles. Pd can be reduced using hydrazine hydrate ($H_2NNH2.xH_2O$). The micelles can then be broken and the nanoparticles of Pd collected with ethanol.

Figure 9:
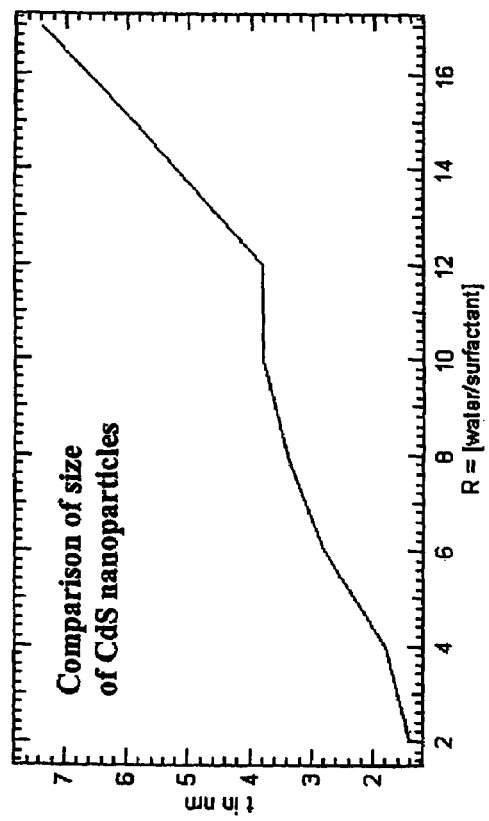
FIG. 9 shows the size of the Pd spherical particle can be dependent on the mole % ratio of water to surfactant, for example water to Igepal™ to water, which is referred to as the R value.

As FIG. 9 shows, the size of the Pd spherical particle can be dependent on the mole % ratio of water to surfactant, for example water to Igepal™, which is referred to as the R value. The larger the R value, the larger the radius of the particle.

Figure 11:
FIG. 11 shows an HF TEM for spherical Pd sample no. Pd 1-91 R=8.1-13 listed in FIG. 10.
Figure 12:
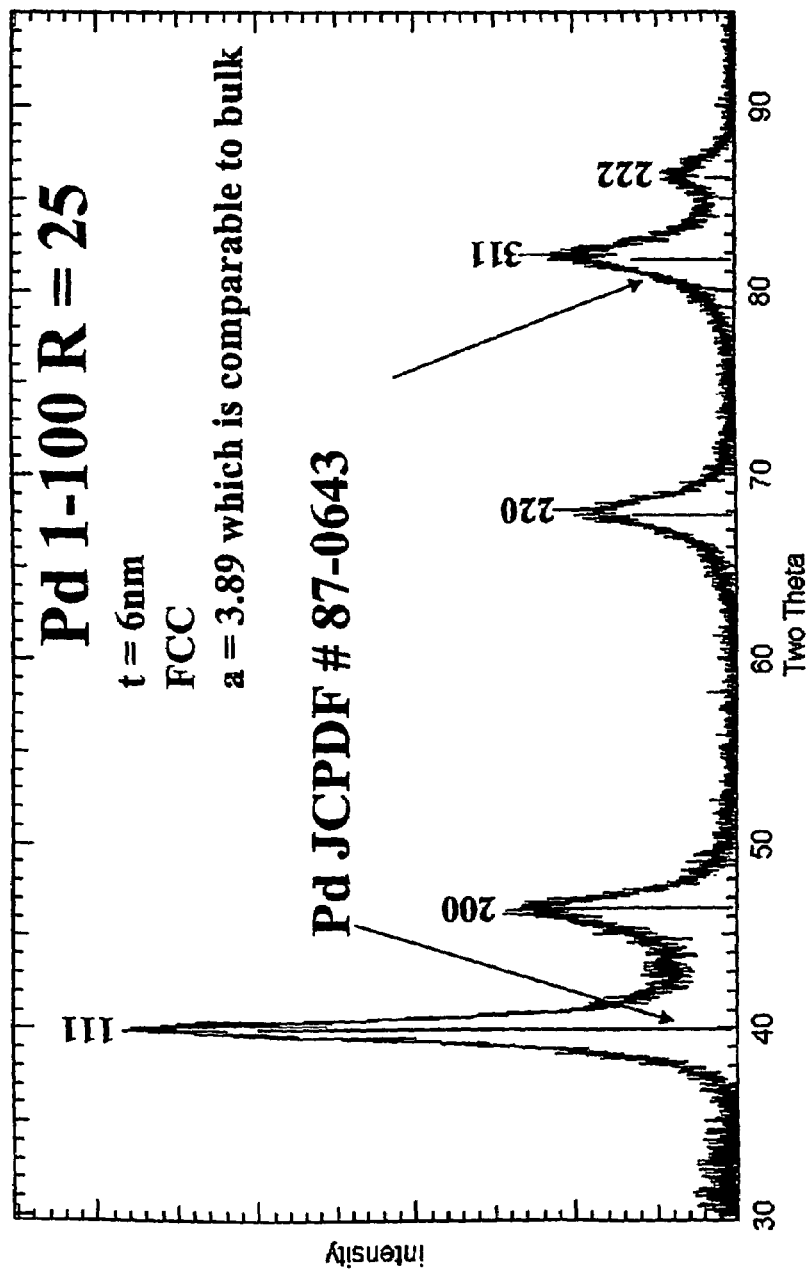
FIG. 12 shows the XRD of spherical Pd 1-100 R=25 listed in FIG. 10.

FIG. 10 lists several exemplary samples of Pd synthesized in accordance with this invention. FIG. 11 shows an HF TEM for spherical Pd sample no. Pd 1-91 R=8.1-13 listed in FIG. 10. FIG. 12 shows the XRD of spherical Pd 1-100 R=25 listed in FIG. 10.

Figure 13:
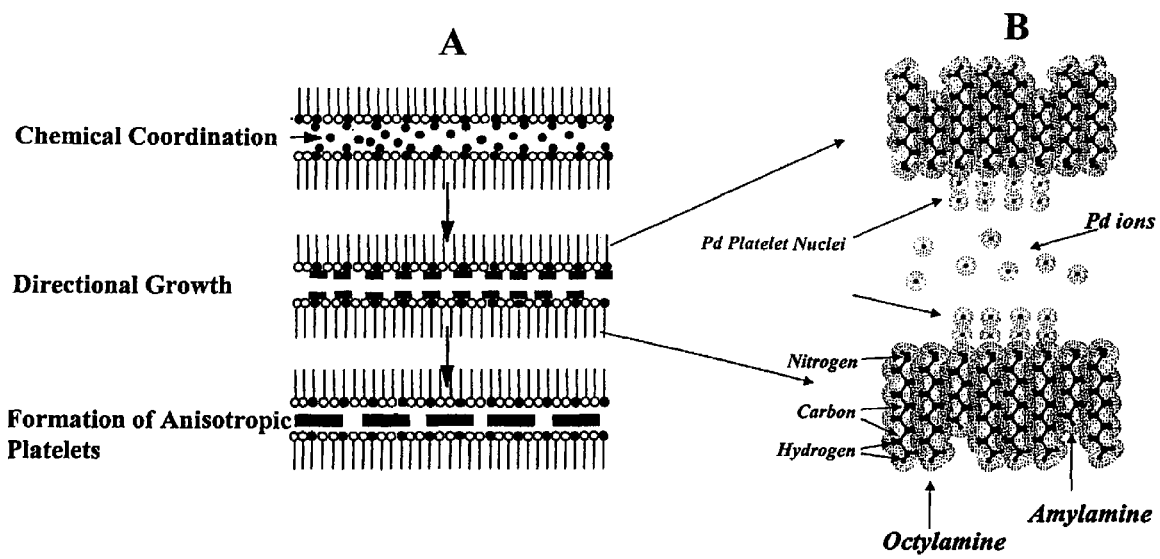
FIG. 13 shows an example of a method for the synthesis of preparing platelet Pd particles in accordance with embodiments of this invention.

FIG. 13 shows an example of a method for the synthesis of preparing platelet Pd particles in accordance with embodiments of this invention. In particular, a method can be utilized in which palladium or the like can form into platelets in the presence of a surfactant that is preferably octylamine, optionally in combination with amylamine, in a ratio of 25 parts octylamine to 1 part amylamine in accordance with embodiments of this invention.

Figure 14:
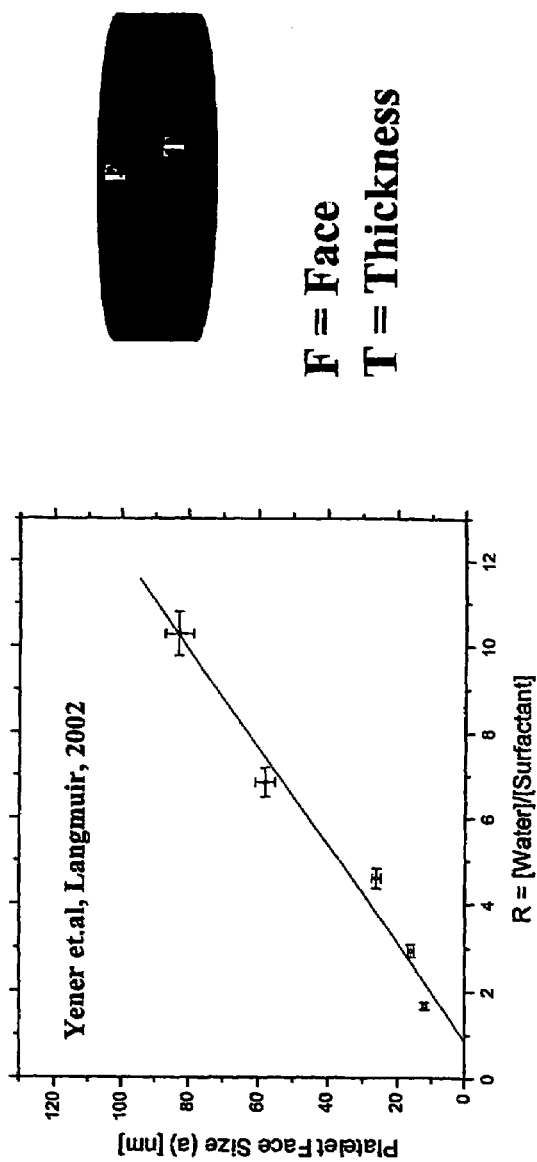
FIG. 14 shows the platelet size can be controlled by controlling the ratio of water to surfactant.

As shown in FIG. 14, the platelet size can be controlled by controlling the ratio of water to surfactant.

Figure 15:
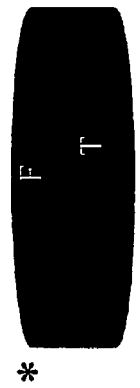
Figure 17:
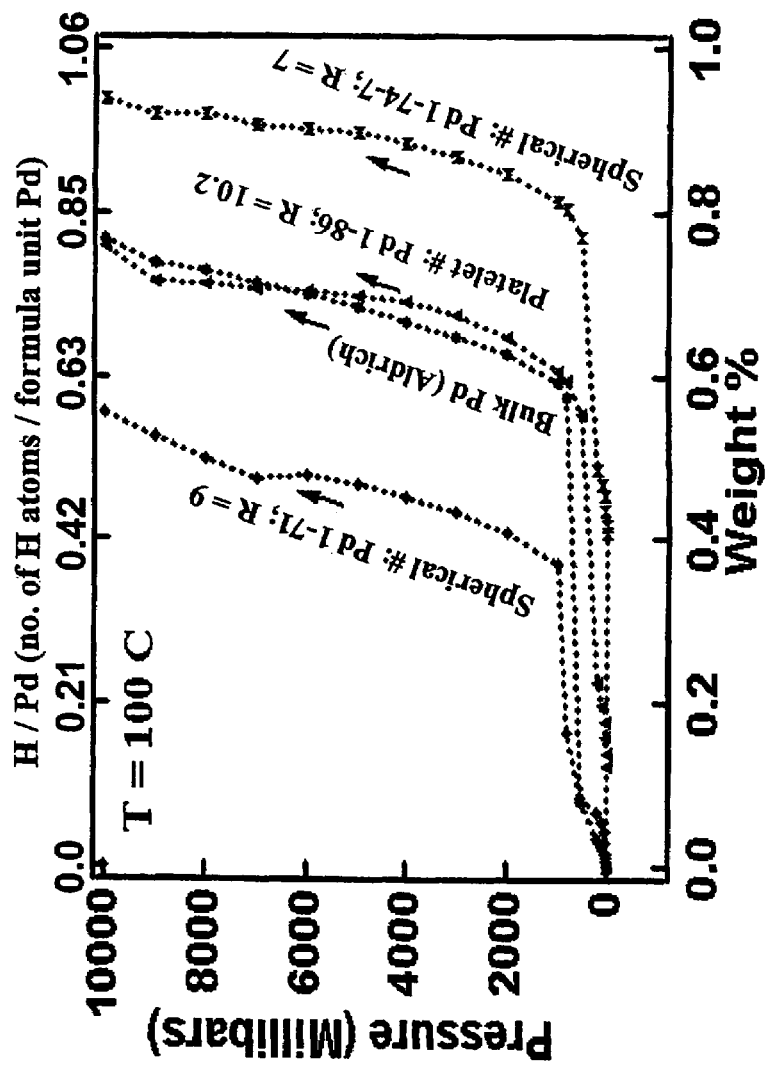
FIG. 17 shows adsorption isotherms of palladium nanoparticles.

FIGS. 15 and 16 lists several exemplary samples of Pd synthesized in accordance with embodiments of this invention. FIG. 17 shows adsorption isotherms of palladium nanoparticles.

FIG. 18 shows a comparison of TGA evaluations at 100° C. for nanoparticle and bulk samples.

Figures 19, 20:
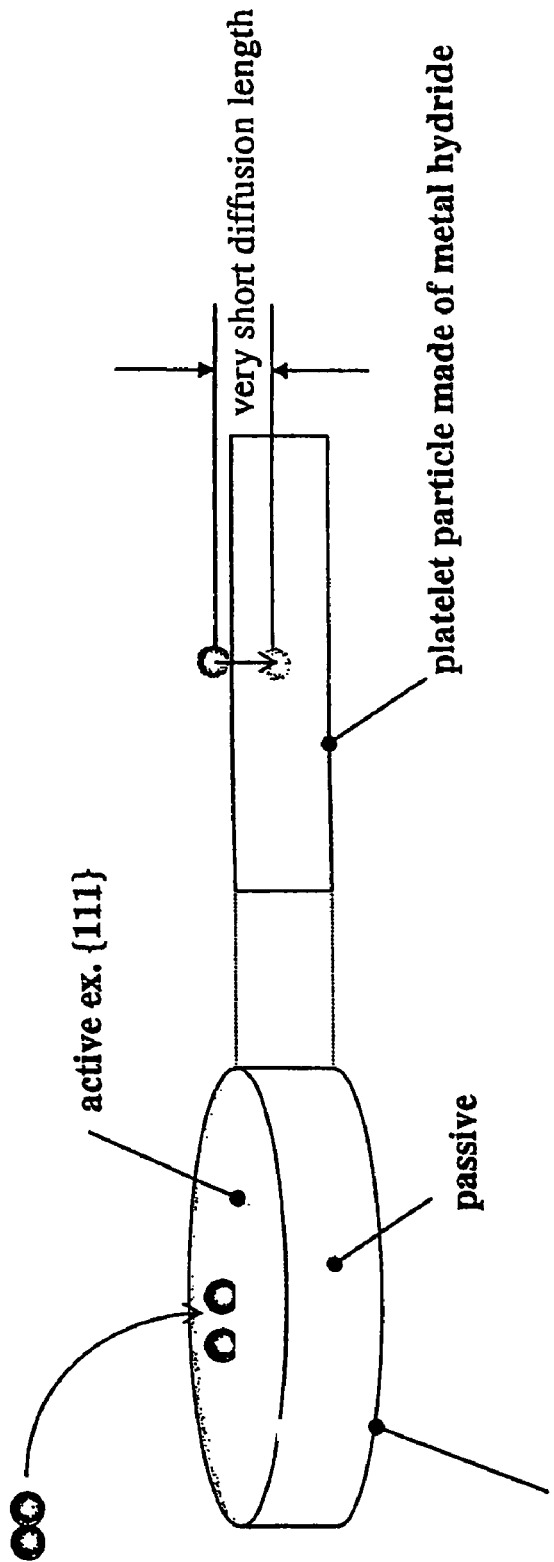
FIGS. 19 and 20 show exemplary platelet in accordance with embodiments of this invention.

FIGS. 19 and 20 show exemplary platelet in accordance with embodiments of this invention.

FIG. 21 shows TGA compositional analysis for several examples of spherical particles and of platelets in accordance with embodiments of this invention.

FIG. 22 is a diagram showing the difference between a nanocrystalline material from nanoparticles in accordance with embodiments of this invention.

FIG. 23 shows how morphology can affect particle packing in accordance with embodiments of this invention. Since the percentage of active surface in molecular dissociation can be controlled by morphology, catalytic activity can be improved through morphology control. More specifically, hydrogen dissociation on a hydrogen storage material (e.g., MH alloy) can be improved by morphology control. Thin platelets are also capable of hydrogen diffusion. This can further improve the kinetics of hydrogen absorption.

FIG. 24 shows HRTEM for platelet nanoPd in accordance with embodiments of this invention.

FIG. 25 shows AFM of platelet nanoPd in accordance with embodiments of this invention.

FIG. 26 shows hydrogen adsorption of spherical Pd in accordance with embodiments of this invention.

FIG. 27 shows hydrogen adsorption of Pd platelets in accordance with embodiments of this invention.

FIG. 28 shows hydrogen saturation versus Pd material in accordance with embodiments of this invention.

Figure 29:
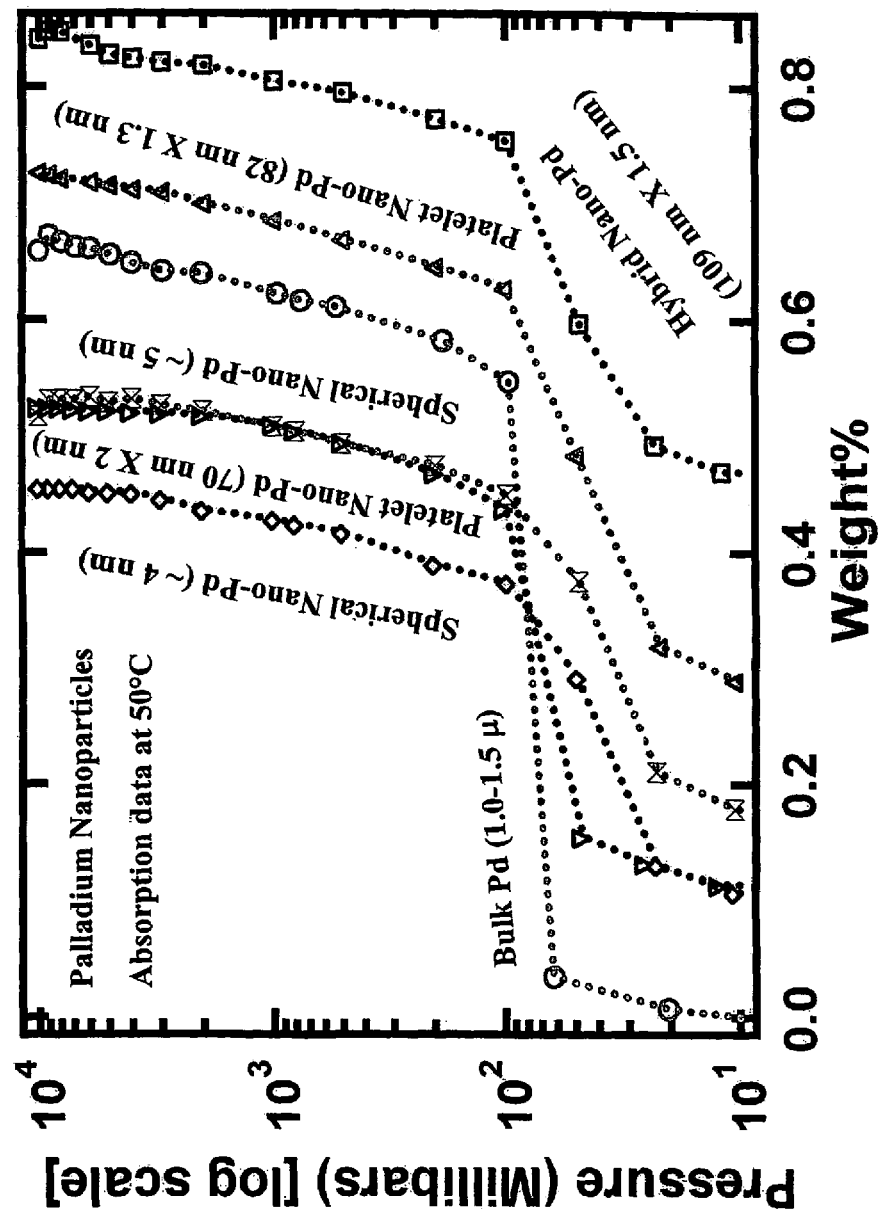
FIG. 29 shows hydrogen absorption isotherms of Pd nanoparticles using thermogravimetric analysis in accordance with embodiments of this invention
Figure 30:
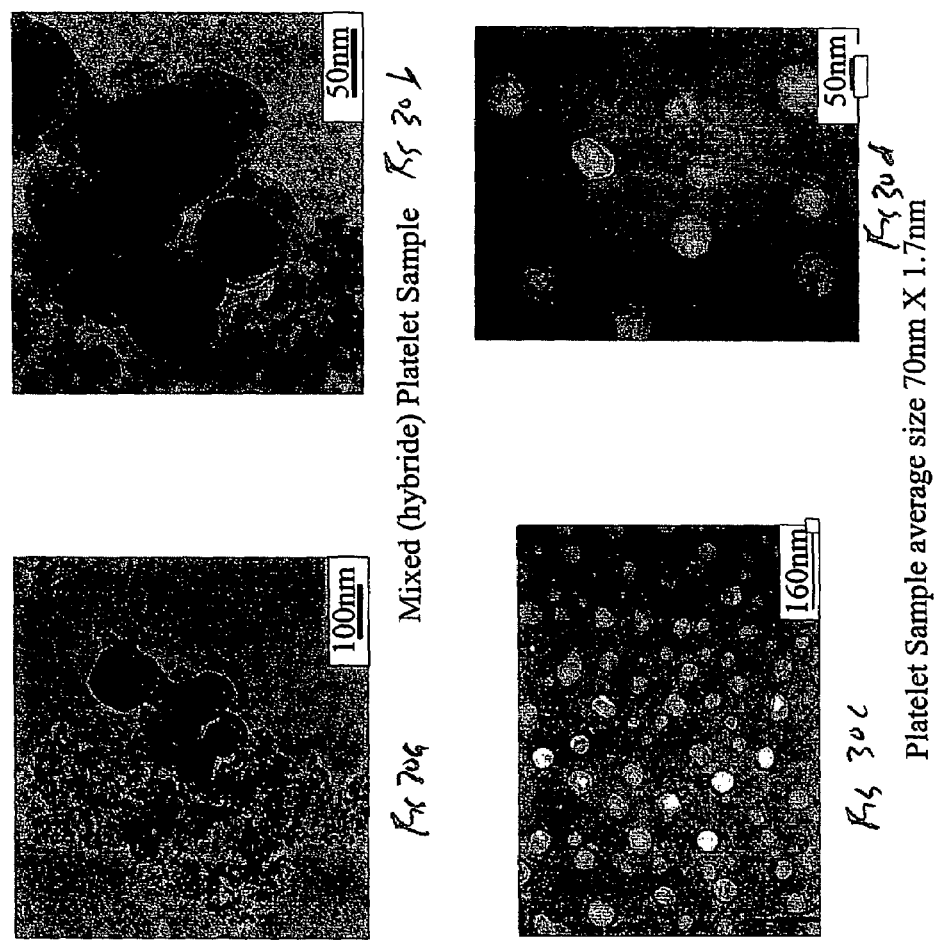
FIGS. 30a, 30b, 30c and 30d show HRTEM of platelet particles in accordance with embodiments of this invention.

FIG. 29 shows hydrogen absorption isotherms of Pd nanoparticles using thermogravimetric analysis in accordance with embodiments of this invention FIGS. 30a, 30b, 30c and 30d show HRTEM of platelet particles in accordance with embodiments of this invention.

FIG. 31 shows a review of nanoPd samples tested for hydrogen storage in accordance with embodiments of this invention.

Figure 32:
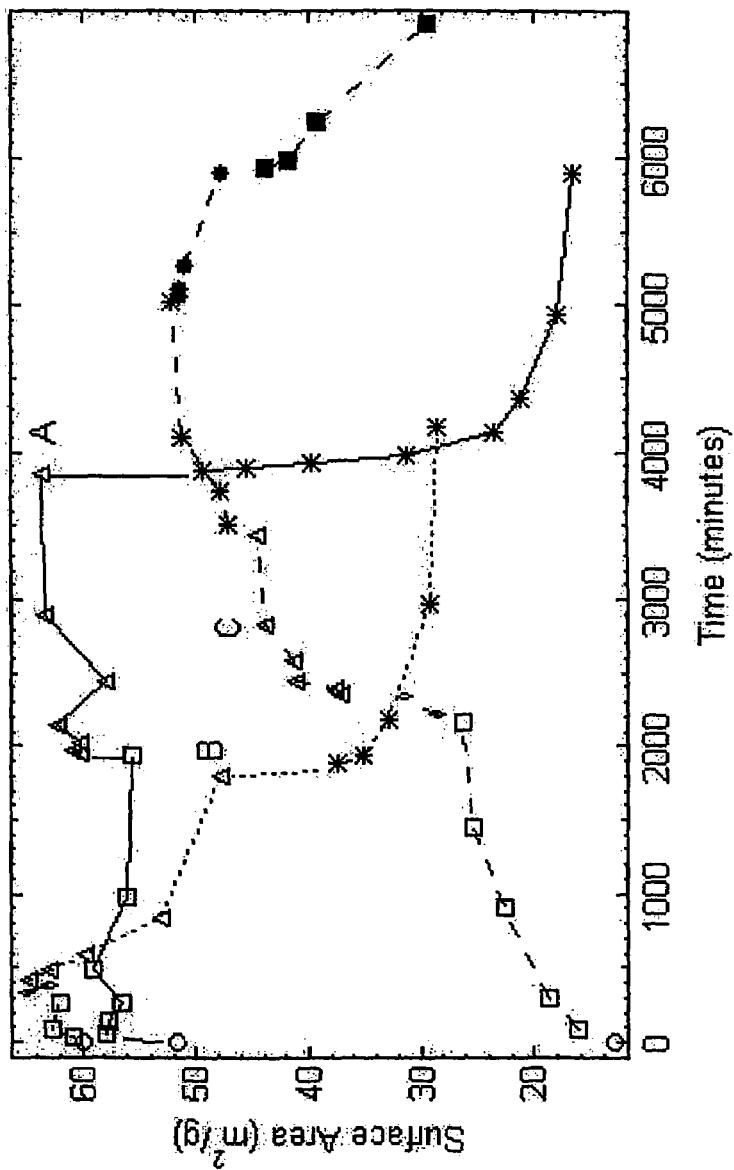
FIG. 32 shows sintering of platelet particles in accordance with embodiments of this invention.
Figure 33:
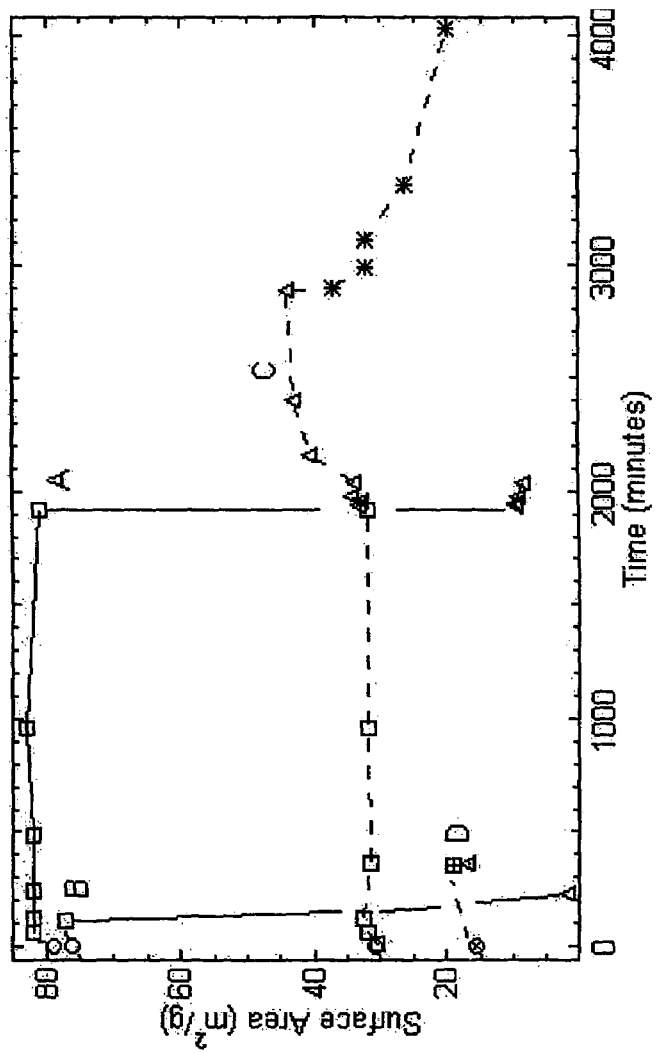
FIG. 33 shows sintering of spherical particles in accordance with embodiments of this invention.

Nanoscale materials, metals in particular, sinter at low temperatures. While this property can be desirable in some applications, such as ceramic composites and coatings, many applications require particles to remain unsintered. During sintering, surface area decreases, resulting in lowered surface activity. In addition to the loss of surface activity, thermal stability, particularly in air, can be a concern. The processing dilemmas posed by such surface mediated oxidation must also be addressed to achieve the potential of nanoscale particulates. FIGS. 32 and 33 show the results of sintering studies for nanopalladium In particular, FIG. 32 shows sintering of platelet particles in accordance with embodiments of this invention and FIG. 33 shows sintering of spherical particles in accordance with embodiments of this invention.

Figure 34:
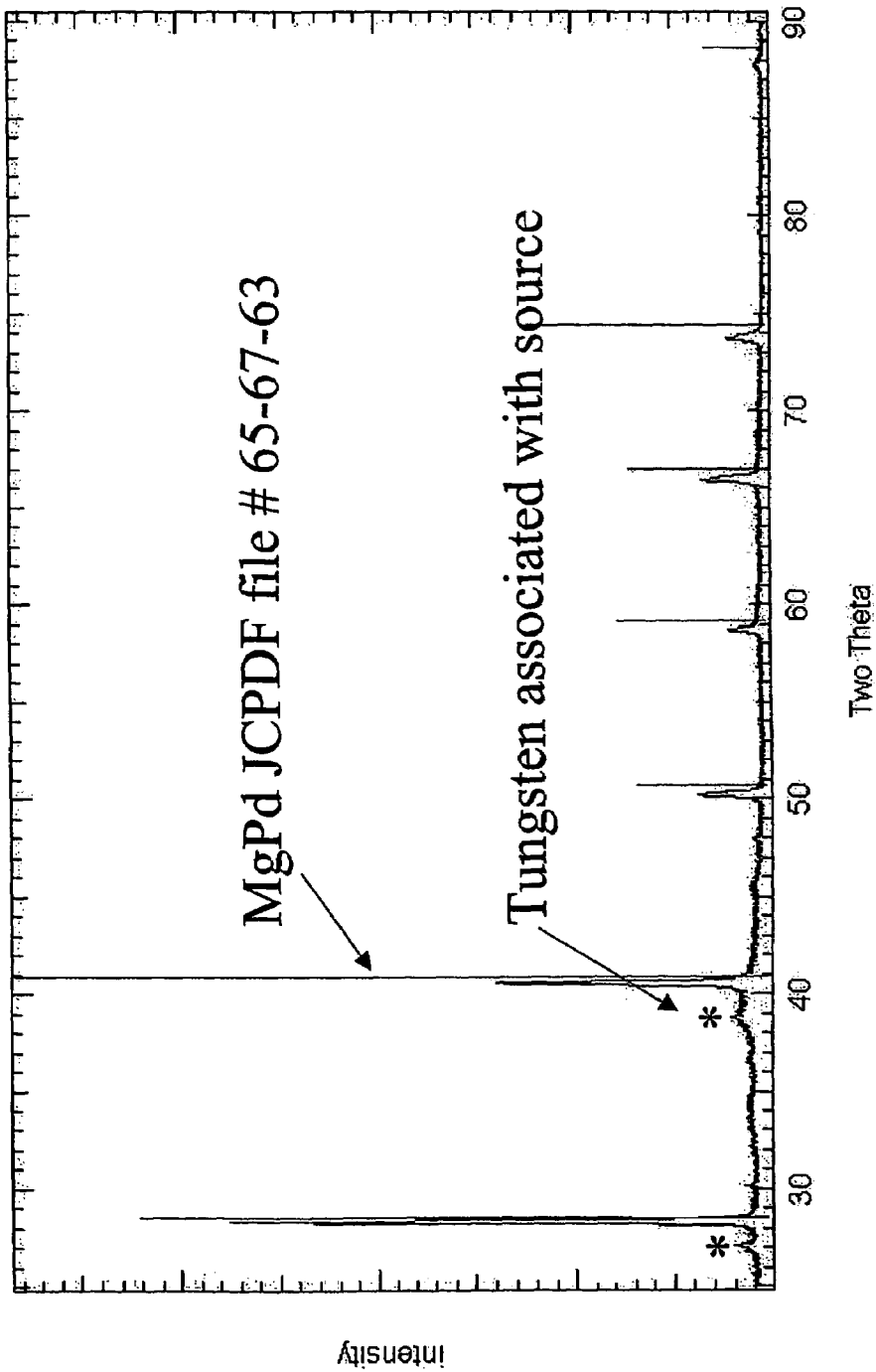
FIG. 34 shows an example of MgPd alloy in accordance with embodiments of this invention.
Figure 35:
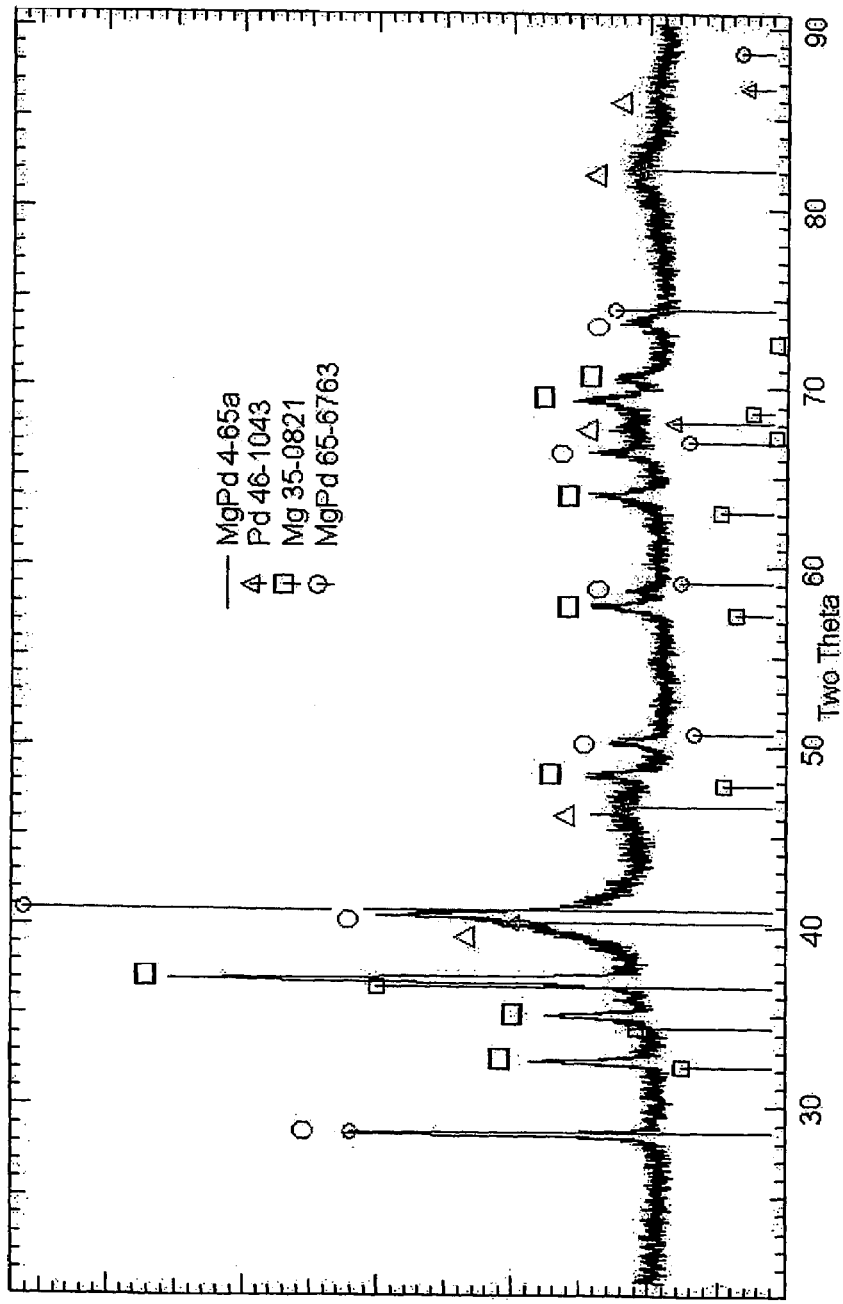
FIG. 35 shows an example of MgPd alloy with Mg and Pd metal in accordance with embodiments of this invention.

FIG. 34 shows an example of MgPd alloy in accordance with embodiments of this invention. FIG. 35 shows an example of MgPd alloy with Mg and Pd metal in accordance with embodiments of this invention.

Although embodiments of this invention have been described in detail, it will be understood that this invention is not limited to the above-described embodiments, and various modifications in construction may be made without departing from the spirit and scope of this invention and any and all equivalents thereof as defined in the following claims.

What is claimed is:

1. A hydrogen storage material comprising metal nanoparticles that are a mixture of nanometer scale platelets and nanometer scale equiaxial particles, wherein said nanometer scale equiaxial particles comprise a metal core covered by a metal shell or metal coating, wherein the metal core is Mg or an alloy containing Mg, and wherein said platelets comprise nanometer scale Pd platelets that have a thickness of about 1 nm to about 200 nm and a face dimension of about 10 nm to about 1000 nm, an aspect ratio (face diameter divided by thickness) of the nanometer scale platelets ranges from about 10 nm to about 100 nm.

2. The hydrogen storage material of claim 1, wherein the nanoparticles form a metal core covered by a metal shell or metal coating that provides oxidation resistance to the metal core, which is less noble than the coating.

3. The hydrogen storage material of claim 2, wherein said shell or coating is selected from Cr, Mn, Fe, Co, Ni, Cu, Pd, Pt, Au, or an alloy containing one or more of these metals.

4. The hydrogen storage material of claim 1, wherein the nanoparticles form a metal core covered by a metal shell or metal coating that provides catalysis for dehydrogenation.

5. The hydrogen storage material of claim 1, wherein the nanoparticles form a metal core covered by a) a first metal coating that provides oxidation resistance to the core metal, which is less noble than the coating, and b) a second metal coating that provides catalysis for dehydrogenation.

6. The hydrogen storage material of claim 1, wherein the nanoparticles form a metal core covered by a first coating that provides oxidation resistance to the core metal, which is less noble than the coating, and/or a second coating that provides catalysis for dehydrogenation.

7. The hydrogen storage material of claim 6, wherein said first and/or second coating is selected from Cr, Mn, Fe, Co, Ni, Cu, Pd, Pt, Au, or an alloy containing one or more of these metals.

* * * * *